US012700233B2

(12) United States Patent
Fuyuno et al.

(10) Patent No.: US 12,700,233 B2
(45) Date of Patent: Aug. 4, 2026

(54) INFORMATION PROCESSING APPARATUS, INFORMATION PROCESSING SYSTEM, INFORMATION PROCESSING METHOD, AND NON-TRANSITORY COMPUTER READABLE MEDIUM

(71) Applicant: NEC Corporation, Minato-ku (JP)

(72) Inventors: Tetsuya Fuyuno, Tokyo (JP); Masahiro Kouchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 53 days.

(21) Appl. No.: 18/567,173

(22) PCT Filed: Jun. 10, 2021

(86) PCT No.: PCT/JP2021/022070

§ 371 (c)(1),
(2) Date: Dec. 5, 2023

(87) PCT Pub. No.: WO2022/259450

PCT Pub. Date: Dec. 15, 2022

(65) Prior Publication Data

US 2025/0078502 A1 Mar. 6, 2025

(51) Int. Cl.
G06V 20/20 (2022.01)
G06F 3/0484 (2022.01)
(Continued)

(52) U.S. Cl.
CPC ............ G06V 20/20 (2022.01); G06F 3/0484 (2013.01); G06F 3/0487 (2013.01); G06V 20/50 (2022.01); G06V 40/11 (2022.01); G06Q 30/0267 (2013.01)

(58) Field of Classification Search
CPC ........ G06V 20/20; G06V 20/50; G06V 40/11; G06F 3/0484; G06F 3/0487; G06F 3/011;
(Continued)

(56) References Cited

U.S. PATENT DOCUMENTS

2011/0221669 A1* 9/2011 Shams .................. G06F 1/1673
345/156
2012/0249741 A1* 10/2012 Maciocci .............. G06T 19/006
348/51
(Continued)

FOREIGN PATENT DOCUMENTS

JP 2001-134618 A 5/2001
JP 2002-342354 A 11/2002
(Continued)

OTHER PUBLICATIONS

International Search Report for PCT Application No. PCT/JP2021/022070, mailed on Aug. 24, 2021.
(Continued)

*Primary Examiner* — William A Beutel
(74) *Attorney, Agent, or Firm* — Sughrue Mion, PLLC

(57) ABSTRACT

An information processing apparatus includes an image acquisition unit that acquires a photographed image generated by photographing a user's view by a user terminal, a specification unit that detects an exteriorly-installed facility object related to a facility from the photographed image and specifying a facility of interest based on the detected exteriorly-installed facility object, a generation unit that generates superimposition information based on facility-related information related to the facility of interest, and an output control unit that makes the user terminal display the superimposition information in such a manner that the superimposition information overlaps a view area indicating the user's view.

13 Claims, 20 Drawing Sheets

(51) Int. Cl.
  *G06F 3/0487*       (2013.01)
  *G06V 20/50*       (2022.01)
  *G06V 40/10*       (2022.01)
  *G06Q 30/0251*      (2023.01)

(58) Field of Classification Search
  CPC .. G06F 3/017; G06F 3/04815; G06F 3/04817;
      G06F 3/0482; G06F 3/04842; G06F
      3/04845; G06F 3/04847; G06F 3/0488;
      G06Q 30/0267; G06Q 30/02; G06Q
      50/10; H04N 5/66
  See application file for complete search history.

(56)                References Cited

U.S. PATENT DOCUMENTS

2013/0044128 A1* 2/2013 Liu ...................... G02B 27/017
                                  345/633
2017/0031560 A1   2/2017 Filip et al.

2017/0316462 A1* 11/2017 Mcconnell ......... G06Q 30/0269

FOREIGN PATENT DOCUMENTS

| | | |
|---|---|---|
| JP | 2015-158866 A | 9/2015 |
| JP | 2016-206447 A | 12/2016 |
| JP | 2017-126142 A | 7/2017 |
| JP | 2017-182413 A | 10/2017 |
| JP | 2018-156196 A | 10/2018 |
| JP | 2019-057025 A | 4/2019 |
| JP | 2019-106006 A | 6/2019 |
| JP | 2019-160227 A | 9/2019 |
| JP | 2019-212039 A | 12/2019 |
| JP | 2020-086969 A | 6/2020 |

OTHER PUBLICATIONS

JP Office Action for JP Application No. 2023-526745, mailed on
Apr. 16, 2024 with English Translation.

* cited by examiner

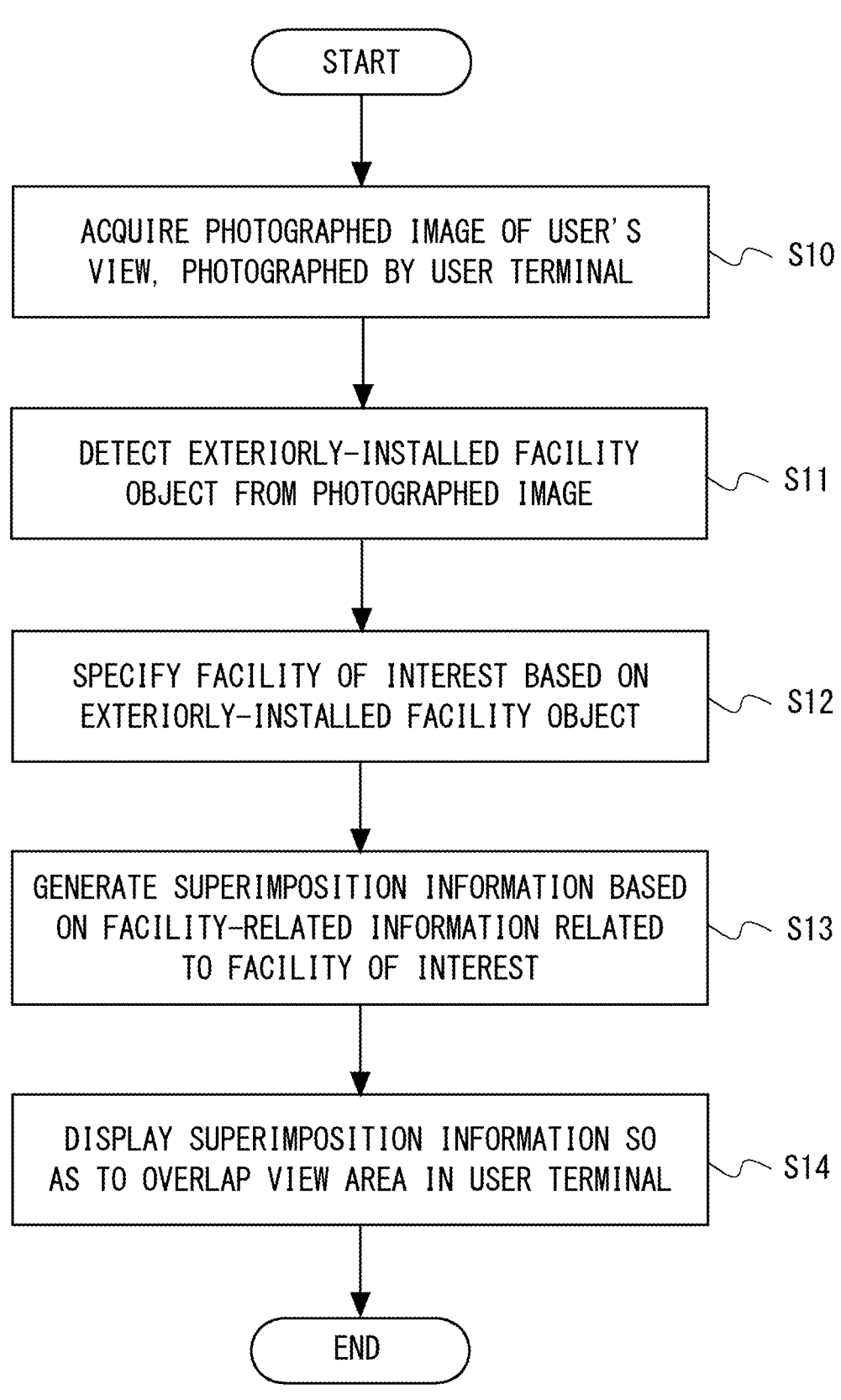

START

ACQUIRE PHOTOGRAPHED IMAGE OF USER'S
VIEW, PHOTOGRAPHED BY USER TERMINAL          S10

DETECT EXTERIORLY-INSTALLED FACILITY
OBJECT FROM PHOTOGRAPHED IMAGE               S11

SPECIFY FACILITY OF INTEREST BASED ON
EXTERIORLY-INSTALLED FACILITY OBJECT         S12

GENERATE SUPERIMPOSITION INFORMATION BASED
ON FACILITY-RELATED INFORMATION RELATED      S13
TO FACILITY OF INTEREST

DISPLAY SUPERIMPOSITION INFORMATION SO
AS TO OVERLAP VIEW AREA IN USER TERMINAL     S14

END

Fig. 2

INFORMATION PROCESSING APPARATUS, INFORMATION PROCESSING SYSTEM, INFORMATION PROCESSING METHOD, AND NON-TRANSITORY COMPUTER READABLE MEDIUM

This application is a National Stage Entry of PCT/JP2021/022070 filed on Jun. 10, 2021, the contents of all of which are incorporated herein by reference, in their entirety.

TECHNICAL FIELD

The present disclosure relates to an information processing apparatus, an information processing system, an information processing method, and a non-transitory computer readable medium. In particular, the present disclosure relates to an information processing apparatus, an information processing system, an information processing method, and a non-transitory computer readable medium for providing information about a facility to a user.

BACKGROUND ART

An apparatus that displays information about an object present in the user's field of view (hereinafter also referred to simply as the user's view or the like) in such a manner that the information overlaps the user's view has been developed. For example, Patent Literature 1 discloses an information processing apparatus that detects a commodity present in an image taken by a camera of a wearable device, generates superimposition information about the commodity, and displays the generated superimposition information on the photographed image in a superimposed manner.

Further, Patent Literature 2 discloses a store server that sets a virtual view of a user based on position information of a head-mounted display (HMD) and the direction of his/her line of sight, and displays, on the HMD, information about a store present in the virtual view retrieved by comparisons with data stored in a map database.

Further, Patent Literature 3 discloses an information processing apparatus that specifies a store in a building included in a photographed image based on terminal position information and direction information of a user terminal, and store position information, and superimposes identification information of the specified store in a position on a hierarchical layer where the store is present in the photographed image.

CITATION LIST

Patent Literature

Patent Literature 1: Japanese Unexamined Patent Application Publication No. 2019-212039
Patent Literature 2: Japanese Unexamined Patent Application Publication No. 2017-182413
Patent Literature 3: Japanese Unexamined Patent Application Publication No. 2017-126142

SUMMARY OF INVENTION

Technical Problem

In the method disclosed in the above-described Patent Literature 1, a user cannot recognize superimposition information about a commodity in the store before he/she actually enters the store. Further, in the methods disclosed in the above-described Patent Literatures 2 and 3, accurate position information and direction information of the user terminal and accurate position information of the store are essential, and thus when an error occurs in any of these information items, the store to be detected cannot be correctly specified.

In view of the above-described problem, an object of the present disclosure is to provide an information processing apparatus, an information processing system, an information processing method, and a non-transitory computer readable medium capable of easily providing information related to a facility to a user before he/she uses the facility.

Solution to Problem

An information processing apparatus according to an aspect of the present disclosure includes:
  image acquisition means for acquiring a photographed image generated by photographing a user's view by a user terminal;
  specification means for detecting an exteriorly-installed facility object related to a facility from the photographed image and specifying a facility of interest based on the detected exteriorly-installed facility object;
  generation means for generating superimposition information based on facility-related information related to the facility of interest; and
  output control means for making the user terminal display the superimposition information in such a manner that the superimposition information overlaps a view area indicating the user's view.

An information processing system according to an aspect of the present disclosure includes:
  a user terminal used by a user and configured to photograph a user's view; and
  an information processing apparatus, in which
  the information processing apparatus includes:
  image acquisition means for acquiring a photographed image generated by the user terminal;
  specification means for detecting an exteriorly-installed facility object related to a facility from the photographed image and specifying a facility of interest based on the detected exteriorly-installed facility object;
  generation means for generating superimposition information based on facility-related information related to the facility of interest; and
  output control means for making the user terminal display the superimposition information in such a manner that the superimposition information overlaps a view area indicating the user's view.

An information processing method according to an aspect of the present disclosure includes:
  acquiring a photographed image generated by photographing a user's view by a user terminal;
  detecting an exteriorly-installed facility object related to a facility from the photographed image and specifying a facility of interest based on the detected exteriorly-installed facility object;
  generating superimposition information based on facility-related information related to the facility of interest; and
  making the user terminal display the superimposition information in such a manner that the superimposition information overlaps a view area indicating the user's view.

A non-transitory computer readable medium according to an aspect of the present disclosure stores a program for causing a computer to perform:

an image acquisition process for acquiring a photographed image generated by photographing a user's view by a user terminal;

a specification process for detecting an exteriorly-installed facility object related to a facility from the photographed image and specifying a facility of interest based on the detected exteriorly-installed facility object;

a generation process for generating superimposition information based on facility-related information related to the facility of interest; and an output control process for making the user terminal display the superimposition information in such a manner that the superimposition information overlaps a view area indicating the user's view.

Advantageous Effects of Invention

According to the present disclosure, it is possible to provide an information processing apparatus, an information processing system, an information processing method, and a non-transitory computer readable medium capable of easily providing information related to a facility to a user before he/she uses the facility.

BRIEF DESCRIPTION OF DRAWINGS

FIG. 2 is a flowchart showing a flow of an information processing method according to the first example embodiment;

EXAMPLE EMBODIMENT

An example embodiment according to the present disclosure will be described hereinafter in detail with reference to the drawings. Components corresponding to or the same as each other are assigned the same or corresponding numerical numbers (or symbols) throughout the drawings, and redundant descriptions thereof are omitted as appropriate for clarifying the explanation.

First Example Embodiment

Figure 1:
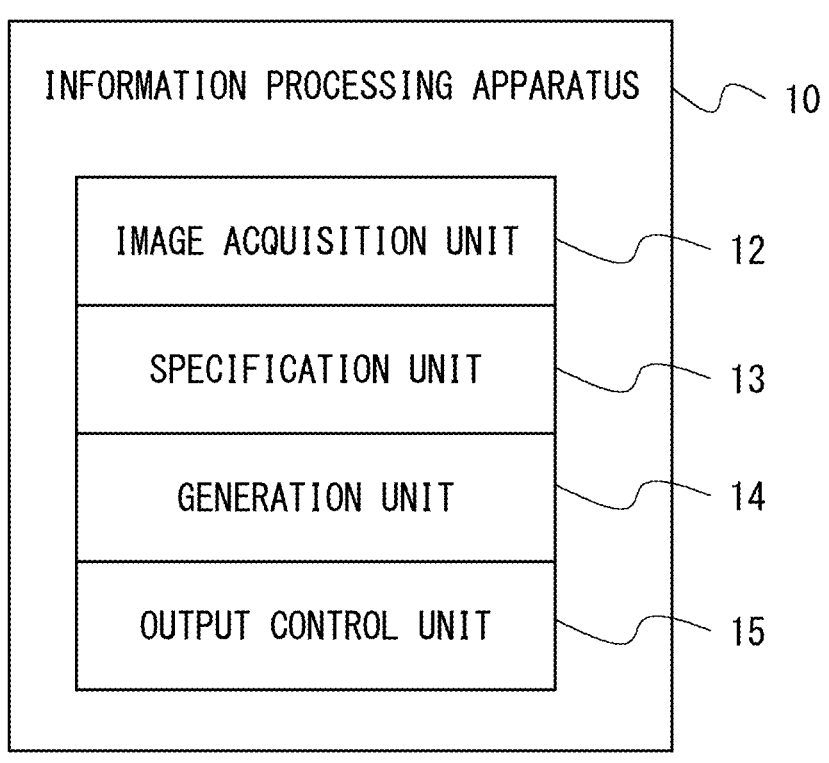
FIG. 1 is a block diagram showing a configuration of an information processing apparatus according to a first example embodiment.

Firstly, a first example embodiment according to the present disclosure will be described. FIG. 1 is a block diagram showing a configuration of an information processing apparatus 10 according to the first example embodiment. The information processing apparatus 10 is an information processing apparatus that provides information about a facility to a user. The facility may be a store, a tourist facility, an art gallery, a museum, a temporarily set up event venue, a theme park, or the like. Note that the information processing apparatus 10 is connected to a network (not shown). The network may be a wired or wireless network. Further, a user terminal (not shown) used by a user is directly or indirectly connected to the network. That is, the information processing apparatus 10 is connected to the user terminal so that they can communicate with each other.

The information processing apparatus 10 includes an image acquisition unit 12, a specification unit 13, a generation unit 14, and an output control unit 15.

The image acquisition unit 12 is also referred to as image acquisition means. The image acquisition unit 12 acquires a photographed image showing a user's view. The photographed image is one that is generated by having the user terminal photograph the user's view. The image acquisition unit 12 supplies the acquired photographed image to the specification unit 13.

The specification unit 13 is also referred to as specification means. The specification unit 13 detects, from the photographed image, an exteriorly-installed facility object related to a facility. Note that the exteriorly-installed facility object is an object that is disposed outside the facility and visible from the outside thereof. For example, the exteriorly-installed facility object is a signboard, a panel with a logo, or an external appearance of an entrance of the facility. The type of exteriorly-installed facility objects to be detected may be determined in advance. Further, the specification unit 13 specifies a facility of interest present in the user's view based on the detected exteriorly-installed facility object. The specification unit 13 supplies identification information (ID) of the specified facility of interest to the generation unit 14.

The generation unit 14 is also referred to as generation means. The generation unit 14 acquires facility-related information related to the facility of interest by using the ID of the specified facility of interest. The facility-related information may be, for example, an advertisement, recommendation information, discount information, or inventory information of a facility or a commodity or a service related to the facility, or information indicating whether a user can reserve a commodity or the like. Further, the generation unit 14 generates superimposition information based on the above-described facility-related information. The superimposition information is image information. The generation unit 14 supplies the generated superimposition information to the output control unit 15.

The output control unit 15 is also referred to as output control means. The output control unit 15 makes (e.g., instructs) the user terminal display the superimposition information in such a manner that the superimposition information overlaps a view area indicating the user's view.

FIG. 2 is a flowchart showing a flow of an information processing method according to the first example embodiment. Firstly, the image acquisition unit 12 of the information processing apparatus 10 acquires a photographed image of a user's view photographed by a user terminal (S10). Next, the specification unit 13 detects an exteriorly-installed facility object from the photographed image (S11). Next, the specification unit 13 specifies a facility of interest based on the detected exteriorly-installed facility object (S12). Next, the generation unit 14 acquires facility-related information related to the specified facility of interest and generates superimposition information based on the acquired facility-related information (S13). Next, the output control unit 15 makes (e.g., instructs) the user terminal display the superimposition information in such a manner that the superimposition information overlaps the user's view area (S14).

As described above, according to the first example embodiment, the information processing apparatus 10 specifies a facility of interest from an exteriorly-installed facility object included in a photographed image, and makes (e.g., instructs) a user terminal output information related to the facility of interest. In this way, the information processing apparatus 10 can easily provide information related to the facility of interest to the user before he/she uses the facility of interest. Therefore, the user can easily determine whether or not to use the facility of interest. For example, in a tourist resort, a user simply looks at an entrance/signboard of a souvenir shop through a user terminal, so that information about picked up souvenirs recommended by that shop can be superimposed on the store or the like and displayed in a popped-up manner in the user terminal. Therefore, the user can compare souvenirs of a plurality of stores with each other without entering the stores. This feature is useful when there is not a plenty of time to select a souvenir or when a store is crowded. Meanwhile, facilities and the like can raise user's interest in them and effectively induce users to use the facilities and the like.

Second Example Embodiment

Next, a second example embodiment according to the present disclosure will be described.

Figure 3:
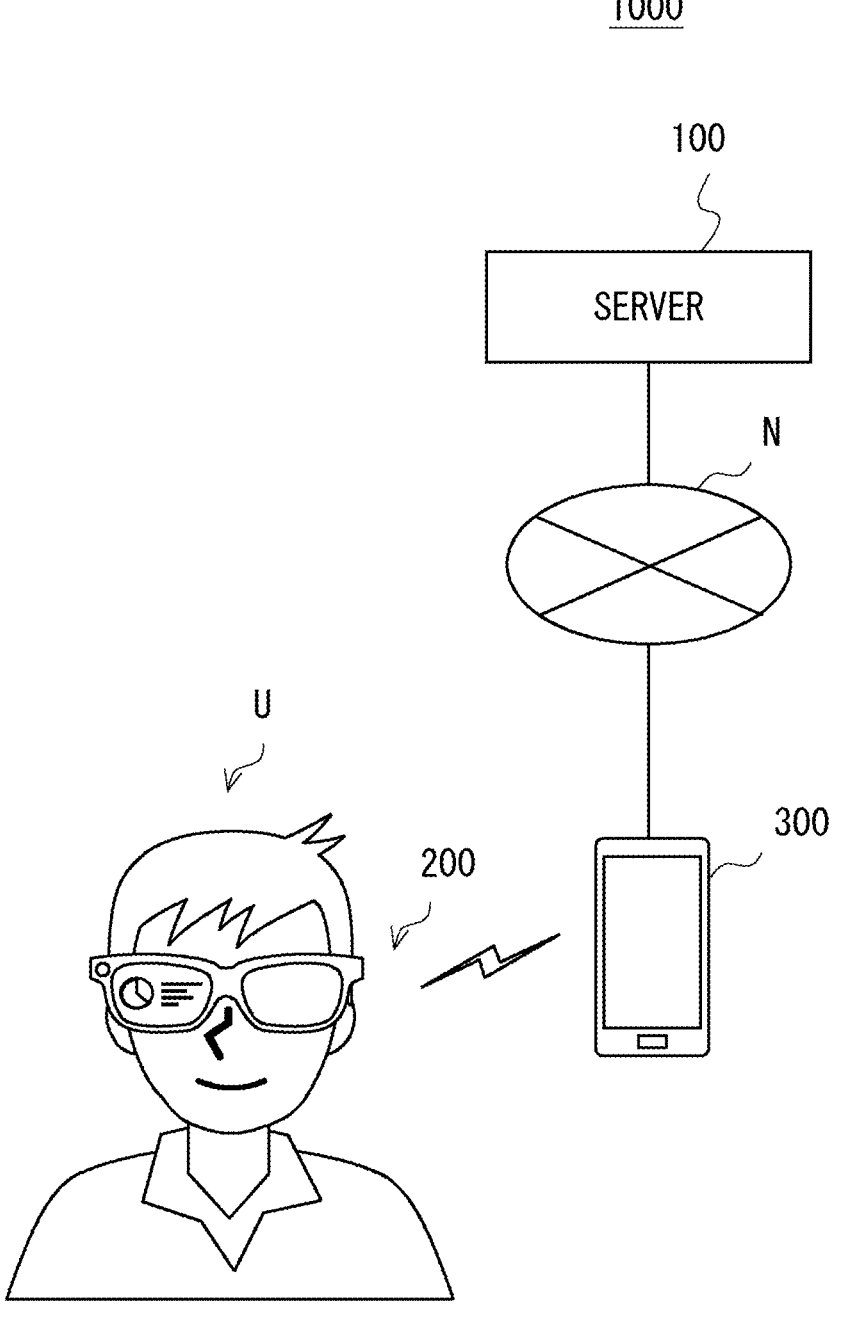
FIG. 3 is a block diagram showing an overall configuration of an information processing system according to a second example embodiment.

FIG. 3 is a block diagram showing an overall configuration of an information processing system 1000 according to the second example embodiment. The information processing system 1000 is a computer system that provides information about a facility from outside the facility to a user walking in a tourist resort or on a street. The information processing system 1000 includes an information processing apparatus (hereinafter referred to as a server) 100 and (a group of) user terminals used by users U. The (group of) user terminals include a first user terminal 200 and a second user terminal 300. The server 100 and the second user terminal 300 are connected to each other through a network N. Note that the network N is a wired or wireless communication line.

The first user terminal 200 is a wearable terminal attached to the body of a user U. For example, the first user terminal 200 is a wearable terminal attached to the head of the user U. As an example, the first user terminal 200 is a spectacle-type terminal such as AR (Augmented Reality) glasses or MR (Mixed Reality) glasses that can display image information (superimposition information) in a view area indicating the view of the user U. The first user terminal 200 is connected to the second user terminal 300 through a wire or wirelessly. For example, the first user terminal 200 is connected to the second user terminal 300 by short-range radio communication such as Bluetooth (Registered Trademark). The first user terminal 200 photographs the view of the user U and transmits the photographed image to the server 100 through the second user terminal 300. Further, the first user terminal 200 superimposes superimposition information received from the server 100 through the second user terminal 300 on the view area of the user U and display it in a superimposed manner.

The second user terminal 300 is an information terminal such as a smartphone, a tablet-type terminal, or a personal computer (PC) used by the user U. The second user terminal 300 relays the transmission and reception of information between the first user terminal 200 and the server 100. Further, the second user terminal 300 registers personal information of the user U in a user database (DB) (not shown) of the server 100 in advance.

The server 100 receives the personal information from the second user terminal 300 and registers the user based on the received personal information. Further, the server 100 receives a photographed image showing the view of the user U from the first user terminal 200 through the second user terminal 300. Then, the server 100 specifies a facility of interest included in the view of the user U from the photographed image, and generates superimposition information based on information related to the facility of interest. Note that the personal information may be used for the generation of the superimposition information. Then, the server 100 transmits the superimposition information to the first user terminal 200 through the second user terminal 300.

Figure 4:
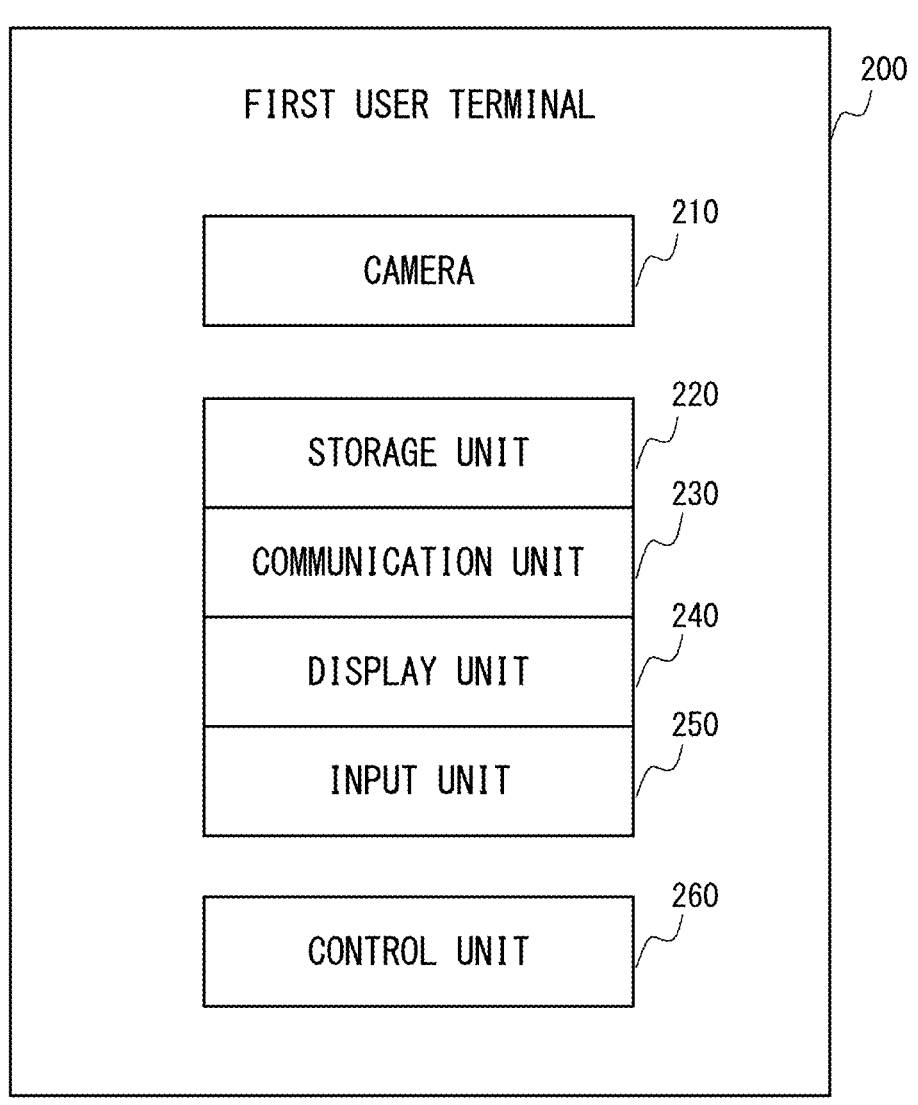
FIG. 4 is a block diagram showing a configuration of a first user terminal according to the second example embodiment.

The first user terminal 200 will be described hereinafter in detail. FIG. 4 is a block diagram showing a configuration of the first user terminal 200 according to the second example embodiment. The first user terminal 200 includes a camera 210, a storage unit 220, a communication unit 230, a display unit 240, an input unit 250, and a control unit 260.

The camera 210 is a photographing apparatus that performs photographing according to control by the control unit 260. The camera 210 is provided in the first user terminal 200 so that its view corresponds to (or conforms to) the view of the user U. For example, the camera 210 is disposed in such a manner that when a user U wears the first user terminal 200, the direction of its optical axis coincides with the direction of the line of sight of the user U. The storage unit 220 is a storage device in which a program(s) for implementing the functions of the first user terminal 200 is stored. The communication unit 230 is a communication interface for communication with the second user terminal 300. The display unit 240 is a display device. When the first user terminal 200 is AR glasses or MR glasses, the display unit 240 is disposed on a lens. The input unit 250 is an input device that receives an input. Note that in the second example embodiment, the input unit 250 is not indispensable. The control unit 260 controls hardware of the first user terminal 200.

The control unit 260 controls the camera 210 and photographs a scene (view) visible to the user U. Then, the control unit 260 transmits the photographed image to the second user terminal 300 through the communication unit 230. Further, the control unit 260 displays superimposition information received from the second user terminal 300 on the display unit 240. Note that in the case where the first user terminal 200 is AR glasses, the view area of the user U corresponds to a photographed image that is obtained by photographing the view area of the user U. In this case, the control unit 260 displays, on the display unit 240, an image that is obtained by superimposing the superimposition information on the photographed image. In contrast, when the first user terminal 200 is MR glasses, the view area of the user U is an area in the real space that the user U can see through the lens. In this case, the control unit 260 displays the superimposition information on the display unit 240 disposed on the lens in such a manner that the superimposition information overlaps the above-described real space.

Figure 5:
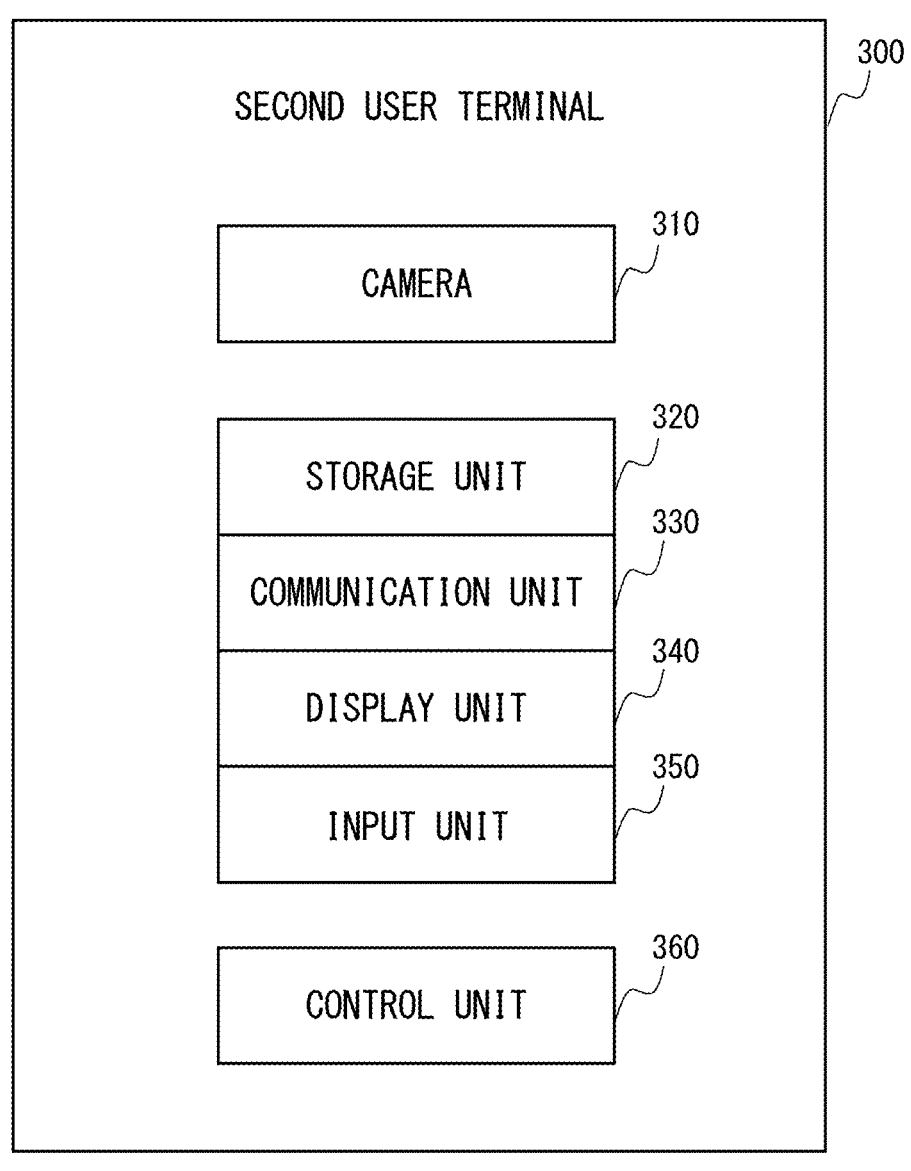
FIG. 5 is a block diagram showing a configuration of a second user terminal according to the second example embodiment.

Next, the second user terminal 300 will be described in detail. FIG. 5 is a block diagram showing a configuration of the second user terminal 300 according to the second example embodiment. The second user terminal 300 includes a camera 310, a storage unit 320, a communication unit 330, a display unit 340, an input unit 350, and a control unit 360.

The camera 310 is a photographing apparatus that performs photographing according to control by the control unit 360. Note that the camera 310 is not indispensable in the second example embodiment. The storage unit 320 is a storage device in which a program(s) for implementing the functions of the second user terminal 300 is stored. The communication unit 330 includes a communication interface for communication with the first user terminal 200 and a communication interface with the network N. The display unit 340 is a display device. The input unit 350 is an input device that receives an input. The display unit 340 and the input unit 350 may be integrally formed, for example, as a touch panel. The control unit 360 controls hardware of the second user terminal 300.

When a user U is registered, the control unit 360 transmits personal information received from the user U through the input unit 350 to the server 100 through the communication unit 330. Further, the control unit 360 receives a photographed image from the first user terminal 200 through the communication unit 330 and transmits the received photographed image to the server 100 together with a user ID. Further, the control unit 360 transmits superimposition information received from the server 100 to the first user terminal 200 through the communication unit 330.

Figure 6:
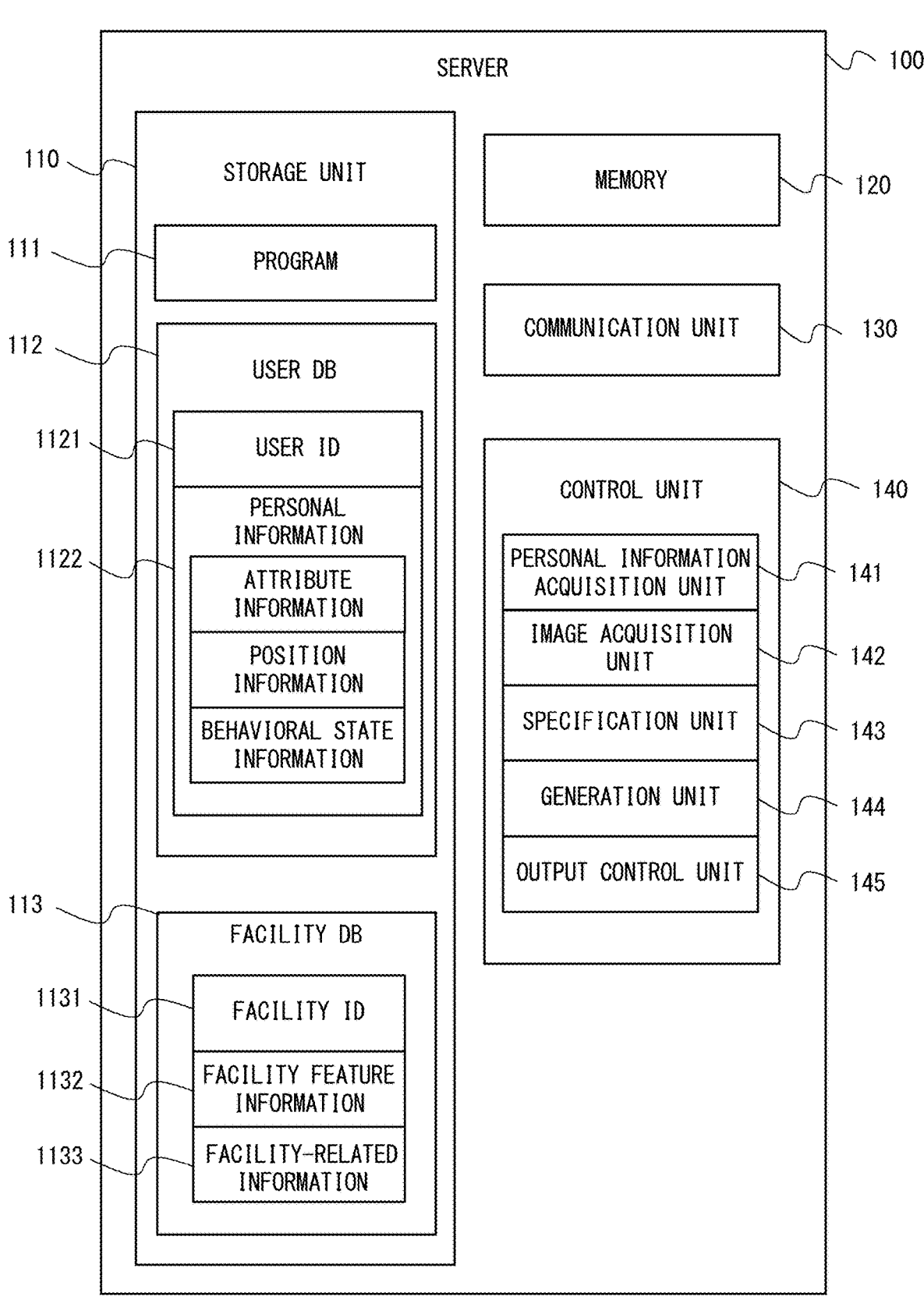
FIG. 6 is a block diagram showing a configuration of a server 100 according to the second example embodiment.

Next, the server 100 will be described in detail. FIG. 6 is a block diagram showing a configuration of the server 100 according to the second example embodiment. The server 100 includes a storage unit 110, a memory 120, a communication unit 130, and a control unit 140.

The storage unit 110 is a storage device such as a hard disk drive or a flash memory. The storage unit 110 stores a program(s) 111, a user DB 112, and a facility DB 113. The program 111 is a computer program in which processes performed in the information processing method according to the second example embodiment are implemented.

The user DB 112 is a database storing basic information related to the user U. Specifically, the user DB 112 stores information associating a user ID 1121 with personal information 1122. Note that the user ID 1121 is information for identifying the user U.

The personal information 1122 includes at least one of attribute information, position information, behavioral state information, a behavior history, a purchase history, and schedule information of the user U. As an example, in this drawing, the personal information 1122 includes attribute information, position information, and behavioral state information of the user U. The attribute information may include at least one of an age, an address, a gender, a family structure, contact information, a credit card number, allergy information, religion information, an inclination attribute, and preference information (taste and preference). The position information is position information of the first user terminal 200 or the second user terminal 300 used by the user U. The behavioral state information is information indicating the current behavioral state of the user U. The behavioral state may be, for example, during a transfer, during a sightseeing, or during a meal.

The facility DB 113 is a database storing various types of information related to facilities. Specifically, the facility DB 113 includes facility IDs 1131, facility feature information 1132, and facility-related information 1133.

The facility ID 1131 is information for identifying a facility.

The facility feature information 1132 is information about feature values of a predetermined type of exteriorly-installed facility object. The feature values are extracted from an image showing the exteriorly-installed facility object.

The facility-related information 1133 is information related to a facility, including basic information about the facility. The basic information may be business hours or position information of the facility, a URL (Uniform Resource Locator) of a website of the facility, information about commodities or services handled (e.g., sold or provided) by the facility, or a URL or the like of an EC (Electronic Commerce) site where the commodities or services can be purchased. Further, the facility-related information 1133 may include, in addition to or instead of the basic information, an advertisement, recommendation information, discount information, or inventory information of a facility or a commodity or a service handled by the facility, or information indicating whether a user can reserve a commodity or the like.

The memory 120 is a volatile storage device such as a RAM (Random Access Memory) and is a storage area for temporarily holding information when the control unit 140 is operating. The communication unit 130 is a communication interface with the network N.

The control unit 140 is a processor or a control apparatus that controls each of the components/structures of the server 100. The control unit 140 loads a program 111 from the storage unit 110 onto the memory 120 and executes the loaded program 111. In this way, the control unit 140 implements the functions of a personal information acquisition unit 141, an image acquisition unit 142, a specification unit 143, a generation unit 144, and an output control unit 145.

The personal information acquisition unit 141 is also referred to as personal information acquisition means. The personal information acquisition unit 141 receives a user registration request from the second user terminal 300 and registers a user. In this process, the personal information acquisition unit 141 acquires personal information of the user U from the second user terminal 300. Further, the personal information acquisition unit 141 may acquire personal information of the user U together with the user ID at a certain timing irrespective of whether the user U is registered or not.

An example of a method for acquiring personal information will be shown hereinafter. For example, the personal information acquisition unit 141 acquires attribute information entered by the user from the second user terminal 300. Further, the personal information acquisition unit 141 acquires position information of the second user terminal 300 from the second user terminal 300 at a predetermined timing. Note that the personal information acquisition unit 141 may generate behavioral state information based on the position information of the second user terminal 300. Alternatively, the personal information acquisition unit 141 may acquire schedule information of the user U from the second user terminal 300 and generate behavioral state information based on the acquired schedule information. Note that the personal information acquisition unit 141 may acquire schedule information of the user U from a schedule management application that manages the schedule of the user U.

When a behavior history is included in the personal information 1122, the personal information acquisition unit 141 may generate the behavior history based on the position history of the second user terminal 300 or the above-described schedule information. Alternatively, the personal information acquisition unit 141 may generate the behavior history from a user purchase history. Note that the personal information acquisition unit 141 may acquire the purchase history of the user U from an application that manages the purchase history.

The personal information acquisition unit 141 registers personal information acquired from the second user terminal 300 and personal information generated based on information acquired from the second user terminal 300 in the user DB 112 while associating them with the user ID that was issued as the user was registered.

The image acquisition unit 142 is an example of the above-described image acquisition unit 12. The image acquisition unit 142 receives and acquires a photographed image from the second user terminal 300 through the first user terminal 200.

The specification unit 143 is an example of the above-described specification unit 13. The specification unit 143 detects a predetermined type of an exteriorly-installed facility object from the photographed image. As an example, when a signboard is defined as a predetermined exteriorly-installed facility object, the specification unit 143 may detect a rectangular area from the photographed image and detect a text area or a graphic area from the rectangular area. Further, as another example, when a panel with a logo is defined as a predetermined exteriorly-installed facility object, the specification unit 143 may detect a graphic area from the photographed image. Further, as another example, when an external appearance of an entrance of a building is defined as a predetermined exteriorly-installed facility object, the specification unit 143 may detect an exterior-appearance area of a building or a peripheral area of a door.

Next, the specification unit 143 cuts out an image area detected from the photographed image and extracts feature values included in the cut-out image. Next, the specification unit 143 compares the feature values extracted from the cut-out image with facility feature information 1132 included (i.e., stored) in the facility DB 113, and determines whether or not there is any facility feature information 1132 of which a degree of similarity with the feature values extracted from the cut-out image is equal to or greater than a predetermined threshold. When there is facility feature information 1132 of which the degree of similarity is equal to or greater than the predetermined threshold, the specification unit 143 specifies a facility ID 1131 corresponding to this facility feature information 1132 as an ID of the facility of interest.

The generation unit 144 is an example of the above-described generation unit 14.

The generation unit 144 acquires facility-related information 1133 associated with the specified facility ID 1131 in the facility DB 113. Then, the generation unit 144 generates superimposition information based on the acquired facility-related information 1133. For example, the generation unit 144 may specify (generate) the acquired facility-related information 1133 itself as superimposition information. Further, when a URL of a website of the facility of interest or a URL of an EC site thereof is included in the facility-related information 1133, the generation unit 144 may access this URL and acquire information about a commodity or a service from the website or the EC site. Then, the generation unit 144 may add the acquired information about a commodity or a service as facility-related information 1133 and include (i.e., incorporate) the facility-related information 1133 in the superimposition information. In this case, the server 100 does not need to store all the information related to all the facilities in the facility DB 113, so that the storage capacity can be saved. Further, the server 100 can provide the latest information about the specified facility of interest to the user U.

Note that when a plurality of pieces of facility-related information 1133 have been acquired, the generation unit 144 may set a priority to each of the pieces of facility-related information 1133 based on the personal information of the user U and generate superimposition information based on the priority of each of the pieces of facility-related information 1133. Note that above-described facility-related information 1133 may include information acquired from the website or the EC site. The priority may be used to limit the amount of facility-related information 1133, based on which superimposition information is generated, to a predetermined amount or to change the display order of the pieces of facility-related information 1133 included in the superimposition information (i.e., change the order according to which the pieces of facility-related information 1133 included in the superimposition information are displayed) or change the display mode of them (i.e., change how to display them).

Examples of a case where a plurality of pieces of facility-related information 1133 have been acquired include (1) a case where there are a plurality of specified facility IDs 1131 (i.e., a case where a plurality of facilities of interest are specified from the photographed image), (2) a case where there are a plurality of pieces of facility-related information 1133 associated with one specified facility ID 1131 (i.e., there are a plurality of pieces of facility-related information 1133 associated with one facility of interest), and a case where both of them are applicable.

In the case of (1), the generation unit 144 first sets a priority to each of specified facility IDs 1131 based on the pieces of facility-related information 1133 associated with the respective specified facility IDs 1131 and the personal information of the user U. Then, the generation unit 144 sets a priority to each of the pieces of facility-related information 1133 associated with the respective facility IDs 1131 based on the priority of that facility ID 1131.

In the case of (2), the generation unit 144 sets a priority to each of the pieces of facility-related information 1133 associated with one facility ID 1131 based on the personal information of the user U.

Note that when both the cases 1 and 2 are applicable, the generation unit 144 may first set a priority to each of the specified facility IDs 1131 associated with respective specified facility IDs 1131 based on the pieces of facility-related information 1133 and the personal information of the user U. Then, the generation unit 144 may set, for each of the facility IDs 1131, a priority to each of pieces of facility-related information 1133 associated with the respective facility IDs 1131 based on the priorities of the facility IDs 1131 and the personal information of the user U. Alternatively, the generation unit 144 may set priorities to all the pieces of facility-related information 1133 associated with the respective facility IDs 1131 so that they match (i.e., coincide with) the priorities of the facility IDs 1131.

In the cases of (1) and (2), examples of the priority setting rule for the facility-related information 1133 include the below-shown setting rules (a) to (c).

(a) The generation unit 144 may set a priority to a facility ID 1131 and facility-related information 1133 associated with the facility ID 1131 based on the distance between the position of the user U and the position of the facility having the facility ID 1131 by using the position information of the second user terminal 300. For example, the generation unit 144 may set the priority in such a manner that the smaller the distance between them is, the higher the priority becomes. Further, for example, the generation unit 144 may set the priority in such a manner that when the distance between them is shorter than a threshold, the priority is increased by a predetermined amount.

(b) The generation unit 144 may calculate, for each piece of facility-related information 1133, a degree of relationship between that piece of facility-related information 1133 and attribute information, such as an age or a gender, of the user U, and set the priority in such a manner that the higher the degree of relationship is, the higher the priority of the facility ID 1131 and the piece of facility-related information 1133 associated with the facility ID 1131 becomes. As an example, for young users U, the generation unit 144 sets the priority of a facility ID 1131 of a facility that handles (e.g., sells or provides) commodities or services for young people and the priority of a facility ID 1131 related to commodities or services for young people to a value higher than those for users U in other age groups by a predetermined amount. Further, for female users U, the generation unit 144 sets the priority of a facility ID 1131 of a facility that handles commodities or services for females and the priority of a facility-related information 1133 related to commodities or services for females to a value higher than those for males by a predetermined amount.

(c) The generation unit 144 may set the priority of a facility ID 1131 of a facility that handles commodities or services that are highly related to the taste and preference of the user U and the priority of facility-related information 1133 related to such commodities or services to a high value. Note that the generation unit 144 may analyze the taste and preference of the user U from the purchase history and/or the behavior history of the user U. For example, the generation unit 144 infers that a commodity that the user U frequently purchases is a commodity that the user U likes, and increases the priority of facility-related information 1133 (information about advertisements and an EC site) related to commodities similar to the frequently-purchased commodity by a predetermined amount. In this process, when there are a plurality of similar commodities, the generation unit 144 may set the amount by which the priority is increased based on the prices of the commodities. For example, the higher the price of a similar commodity is, the more the amount by which the priority is increased is increased. Further, for example, when the user U frequently travels, the generation unit 144 increases the priority of facility-related information 1133 that handles commodities and services highly related to travelling by a predetermined amount.

(d) The generation unit 144 calculates, for each piece of facility-related information 1133, a degree of relationship between that piece of facility-related information 1133 and the current behavioral state of user U, and set the priority in such a manner that the higher the degree of relationship is, the higher the priority of the facility ID 1131 and the piece of facility-related information 1133 associated with the facility ID 1131 becomes. For example, when the user U is "during a sightseeing", the generation unit 144 may increase the priority of the facility ID 1131 of a facility for tourists and the priority of the piece of facility-related information 1133 associated with the facility ID 1131 by a predetermined amount.

Then, the generation unit 144 may select a piece of facility-related information 1133 based on the priority. For example, the generation unit 144 may select a piece of facility-related information 1133 of which the priority is equal to or greater than a predetermined threshold. Alternatively, for example, the generation unit 144 may select a predetermined number of pieces of facility-related information 1133 having highest priorities. Then, the generation unit 144 may specify (generate) the selected piece(es) of facility-related information 1133 as superimposition information.

Alternatively, the generation unit 144 may specify (generate) each of a plurality pieces of facility-related information 1133 as individual pieces of superimposition information, and determine the display order of the pieces of superimposition information or determine the display mode of them. The display order or display mode is the display order of the pieces of superimposition information corresponding to the respective pieces of facility-related information 1133 or the display mode of them when the superimposition information is displayed in the first user terminal 200. For example, the place in the display order of a piece of superimposition information corresponding to a piece of facility-related information 1133 having a high priority may be raised, or such a piece of superimposition information may be highlighted.

As described above, the server 100 provides superimposition information that is personalized according to the personal information of the user U to the user U. As a result, the user U can easily determine whether or not to use a facility before actually using the facility. Consequently, it is possible to increase the satisfaction of the user U. For example, when the user U purchases clothes at a shopping mall or the like, the user U simply looks at an entrance/signboard of a store through the first user terminal 200, so that personalized information is superimposed on the store or the like and displayed in a popped-up manner in the first user terminal 200. As an example, recommended clothes are superimposed on the store which sells clothes that match the taste of the user U and displayed in a popped-up manner. As a result, the user U can compare clothes of a plurality of stores with each other without actually entering the stores. This feature is useful when there is not a plenty of time to select clothes or when a store is crowded. Meanwhile, facilities and the like can effectively induce the user U to use the facilities and the like.

The output control unit 145 is an example of the above-described output control unit 15. The output control unit 145 transmits superimposition information to the first user terminal 200 through the second user terminal 300, and thereby makes (i.e., instructs) the display unit 240 of the first user terminal 200 display the superimposition information. Note that the output control unit 145 may transmit information designating the display position of the superimposition information (i.e., the position at which the superimposition information is displayed) to the first user terminal 200 through the second user terminal 300 in such a manner that the superimposition information overlaps the detected exteriorly-installed facility object or is positioned near the exteriorly-installed facility object in the view area of the user U.

Note that the output control unit 145 may have a function of outputting (e.g., displaying) means for entering personal information to the second user terminal 300.

Figure 7:
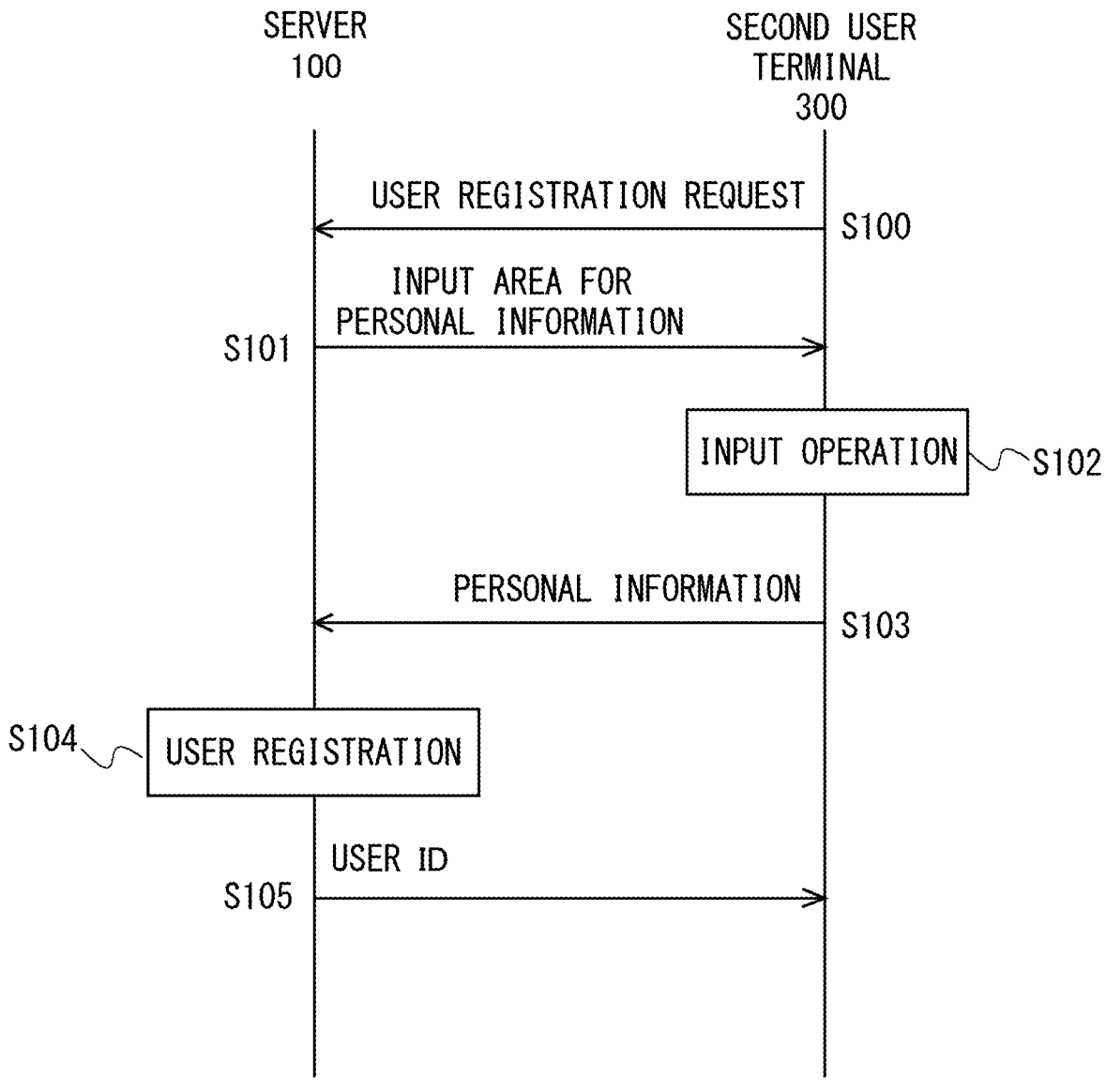
FIG. 7 is a sequence diagram showing a flow of a user registration process according to the second example embodiment.

FIG. 7 is a sequence diagram showing a flow of a user registration process according to the second example embodiment. Firstly, the second user terminal 300 transmits a user registration request to the server 100 (S100). The output control unit 145 of the server 100 transmits an input area (also referred to as an input screen) for personal information to the second user terminal 300 and displays the transmitted input area in the second user terminal 300 (S101). Alternatively, the output control unit 145 of the server 100 may output means for inputting a voice for personal information to the second user terminal 300. Note that the user U performs an operation for entering personal information by using the input unit 350 of the second user terminal 300 (S102). Upon receiving the input operation, the second user terminal 300 transmits the input personal information to the server 100 (S103). As a result, the personal information acquisition unit 141 of the server 100 receives the personal information entered in the input area from the second user terminal 300. The personal information acquisition unit 141 of the server 100, which has received the personal information, issues a user ID, associates the user ID with the personal information, and registers them in the user DB 112 (S104). Then, the personal information acquisition unit 141 of the server 100 notifies the second user terminal 300 of the user ID (S105).

Figure 8:
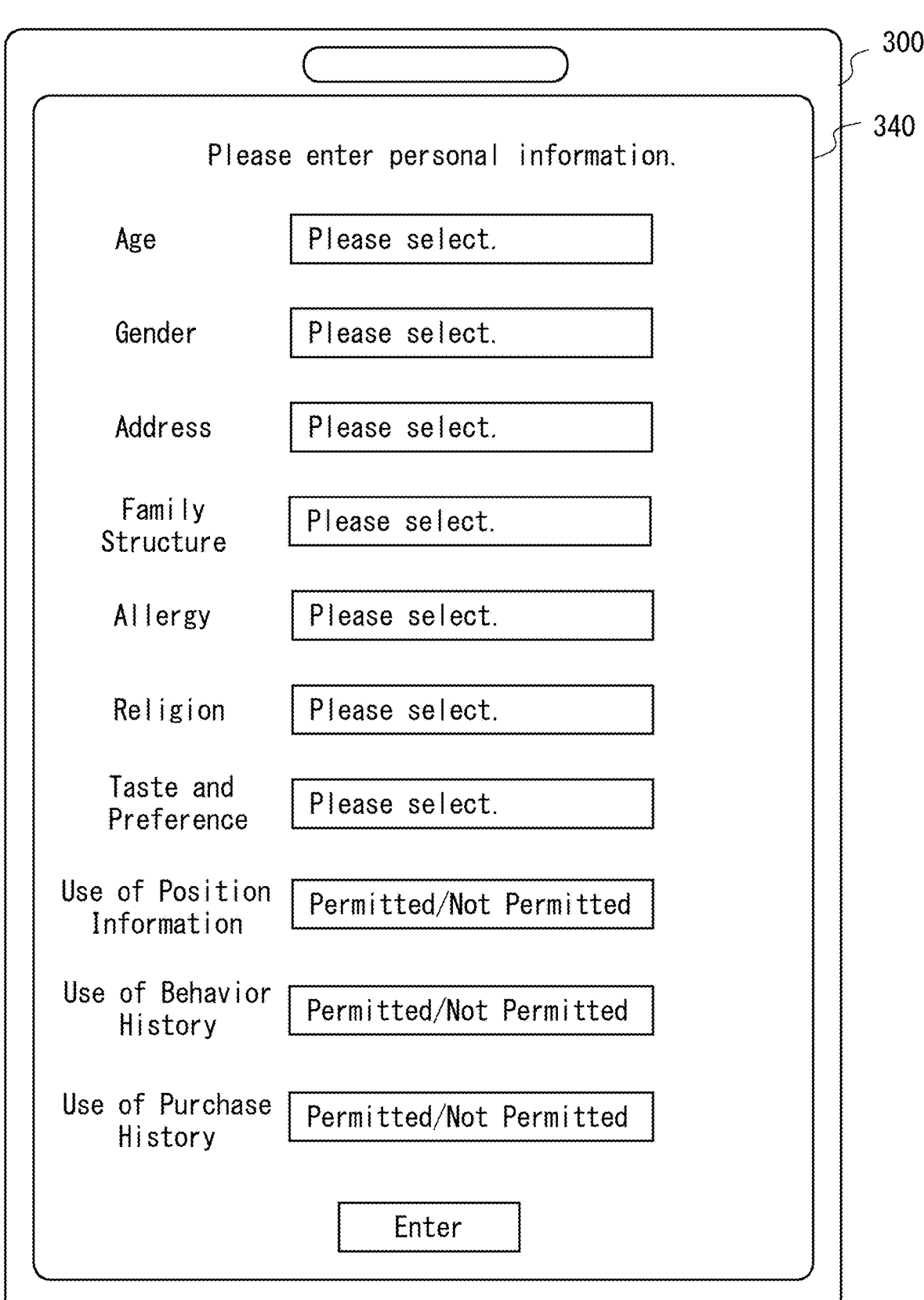
FIG. 8 shows an example of a screen for entering personal information displayed on the second user terminal according to the second example embodiment.

FIG. 8 shows an example of an input screen for personal information displayed in the second user terminal 300 according to the second example embodiment. An input area for personal information necessary for user registration is displayed on the display unit 340 of the second user terminal 300. For example, areas for entering attribute information, whether or not the use of position information of the second user terminal 300 is permitted, whether or not the use of a behavior history is permitted, and whether or not the use of a purchase history is permitted are displayed on the display unit 340. In this drawing, as the input area for attribute information, an input area for an age, a gender, an address, a family structure, an allergy, a religion, and taste and preference is shown.

Figure 9:
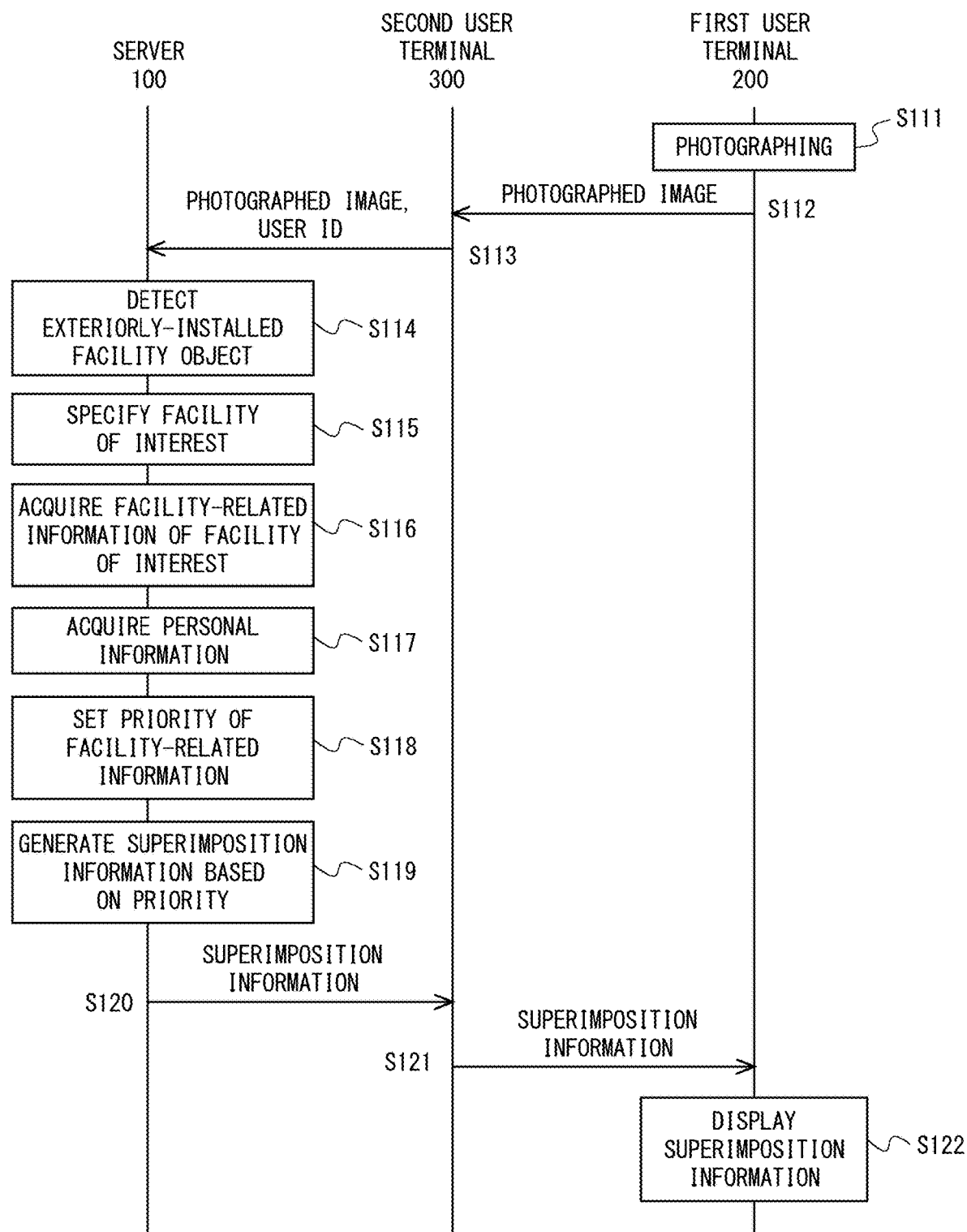
FIG. 9 is a sequence diagram showing a flow of an output process according to the second example embodiment.

FIG. 9 is a sequence diagram showing a flow of an output process according to the second example embodiment. Firstly, the first user terminal 200 photographs the view of the user U (S111), and transmits the photographed image to the second user terminal 300 (S112). Next, the second user terminal 300 transmits the photographed image together with a user ID to the server 100 through the network N (S113). As a result, the image acquisition unit 142 of the server 100 acquires the photographed image and the user ID.

Next, the specification unit 143 of the server 100 detects an exteriorly-installed facility object from the photographed image (S114). Then, the specification unit 143 extracts feature values of the exteriorly-installed facility object, and specifies a facility ID of a facility of interest based on the extracted feature values by using the facility DB 113 (S115). Next, the generation unit 144 acquires facility-related information 1133 associated with the specified facility ID from the facility DB 113 (S116). Further, the generation unit 144 acquires personal information associated with the user ID from the user DB 112 (S117). Next, the generation unit 144 sets a priority of the facility-related information 1133 based on the personal information (S118), and generates superimposition information based on the priority (S119). Then, the output control unit 145 transmits the superimposition information to the second user terminal 300 through the network N (S120). Upon receiving the superimposition information, the second user terminal 300 transmits the received superimposition information to the first user terminal 200 (S121), and displays the superimposition information on the display unit 240 (S122).

Note that in the step S113, the second user terminal 300 transmits the photographed image to the server 100 together with the user ID. Note that the second user terminal 300 may transmit the photographed image to the server 100 together with biometric information of the user U instead of the user ID. The biometric information may be face information (face image or face feature values), fingerprint information, or iris information (iris image or iris feature values). The second user terminal 300 may acquire biological information from an image taken by an inner camera of the first user terminal 200 or from a biological information reading unit (not shown) provided in the second user terminal 300. In this case, the server 100 may further include a biological information database (not shown) in which user IDs are associated with biological information or feature values extracted from biological information, and a biological authentication unit (not shown) that performs biometric authentication based on biological information. Then, the server 100 may perform biometric authentication based on the biological information acquired from the second user terminal 300, and thereby specify the user ID.

Figure 10:
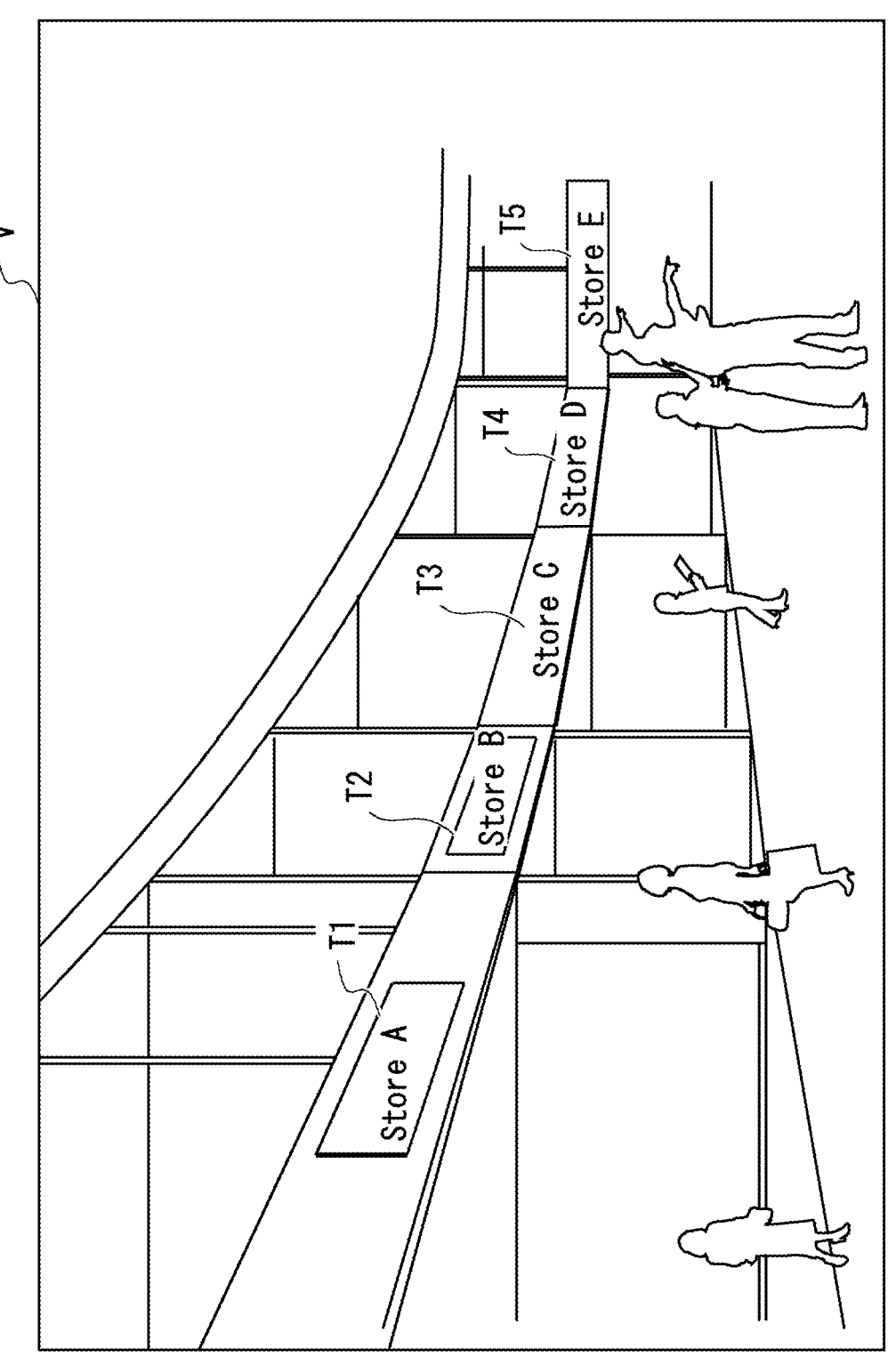
FIG. 10 shows a photographed image of a user's view according to the second example embodiment.

FIG. 10 shows a photographed image V of the view of the user U according to the second example embodiment. In the photographed image V, image areas T1, T2, T3, T4, and T5 each of which shows a signboard, which is an exteriorly-installed facility object, are included. The specification unit 143 specifies a "store A", a "store B", a "store C", a "store D", and a "store E" from the image areas T1, T2, T3, T4, and T5, respectively. Then, the generation unit 144 sets priorities to pieces of facility-related information corresponding to the specified facilities. Note that it is assumed that the generation unit 144 has set priorities of pieces of facility-related information in the order of the "store A", the "store B", the "store C", the "store D", and the "store E". Then, for example, the generation unit 144 generates (i.e., defines) pieces of facility-related information of facilities having three highest priorities, i.e., the "store A", the "store B", and the "store C", as pieces of superimposition information. As described above, the generation unit 144 limits the number of pieces of facility-related information, based on which pieces of superimposition information are displayed in the first user terminal 200, to a predetermined number of pieces of facility-related information having highest priorities. In this way, it is possible to, in the first user terminal 200, effectively display detailed information related to the facilities that have been selected according to the personal information such as taste and preference and a behavior history of the user U. In particular, when the information to be displayed is not personalized, the screen becomes complicated (busy) or the screen is occupied by information that is not related to the user U. However, according to the second example embodiment, such a situation can be avoided.

Figure 11:
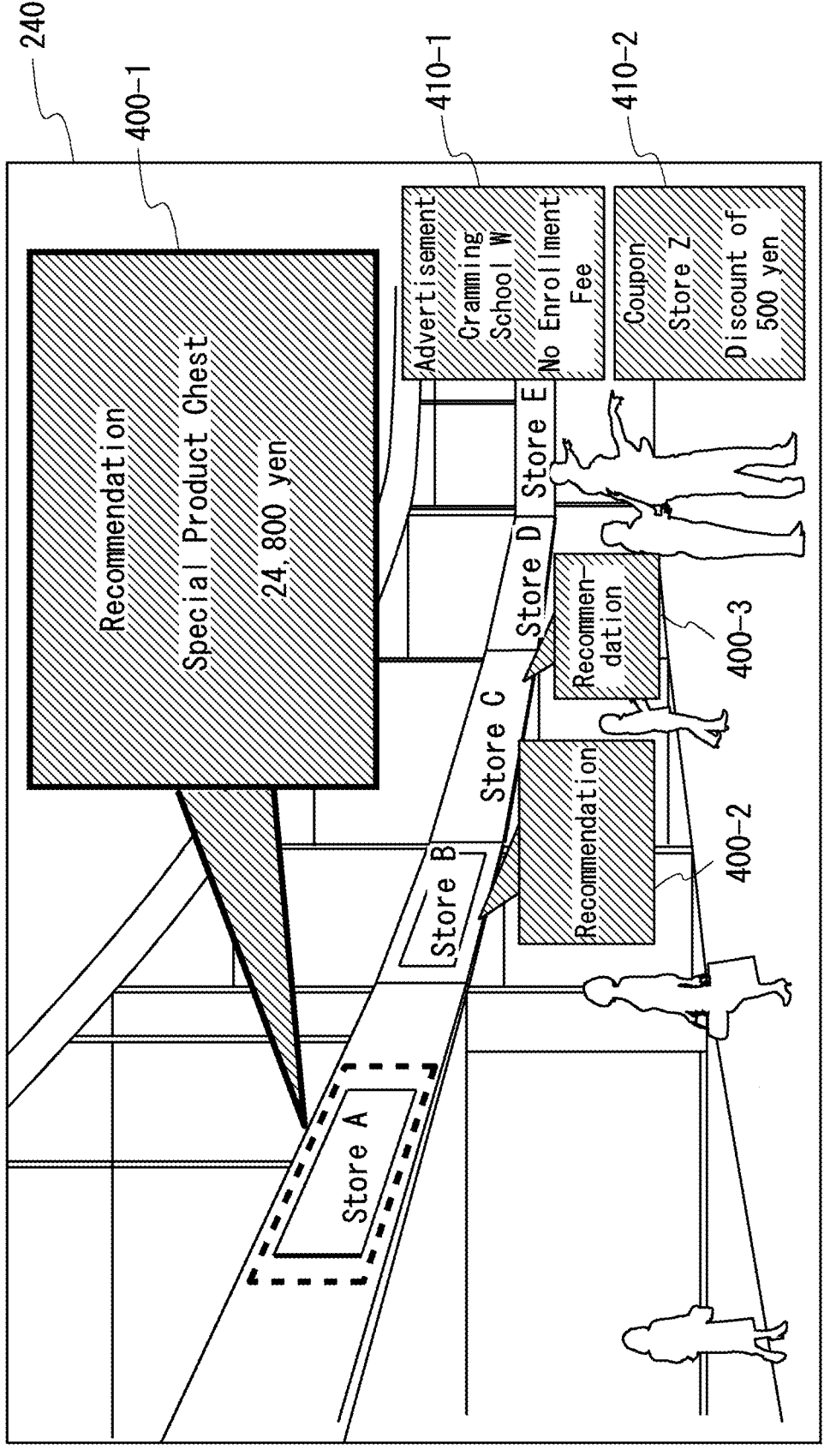
FIG. 11 shows an example of superimposition information displayed in the first user terminal according to the second example embodiment.

FIG. 11 shows an example of pieces of superimposition information displayed in the first user terminal 200 according to the second example embodiment. Hatched areas shown in this drawing indicate pieces of superimposition information displayed on the display unit 240 of the first user terminal 200. The superimposition information includes superimposition images 400-1, 400-2, and 400-3 showing pieces of facility-related information corresponding to the "store A", the "store B", and the "store C", respectively. Note that the generation unit 144 may determine the display mode of the superimposition image 400-1 so that the piece of facility-related information corresponding to the "store A", which has the highest priority, is highlighted. As an example, the highlighting may be implemented by displaying the superimposition image of the information in a large size, flashing the superimposition image of the information, changing the color of the superimposition image of the information, or changing the font of text in the superimposition image.

Note that the areas other than the hatched areas shown in this drawing are the view area of the user U. Each of the superimposition images 400-1, 400-2, and 400-3 may be displayed in a space that does not substantially interfere the view of the user U that is necessary to ensure the safety of his/her walking (also referred to as an empty space). Specifically, the display positions of the superimposition images 400-1, 400-2, and 400-3 may be determined so as to avoid an area where a person is present and an area where a predetermined object is present (or avoid at least one of these areas). The predetermined object may be, for example, a building, a pillar, or a text part of a signboard. That is, the output control unit 145 displays the superimposition images 400-1, 400-2, and 400-3 on the display unit 240 of the first user terminal 200 so as not to overlap, in the view area, any of an area where a person is present, an area in front of the user U in his/her traveling direction (the direction in which the user U is walking), an area where a predetermined object is present, or not to overlap at least one of them. Note that when the user U is, for example, walking in his/her traveling direction, the server 100 may change the positions of empty spaces according to the direction in which the user U is moving. In this way, it is possible to change the places where superimposition images are displayed according to the movement of the user U. Note that the server 100 may set empty spaces so as to avoid an area where a person is present or an area in the traveling direction of the user U, and may set an area where a predetermined object (such as a wall, a building, and a pillar) is present as an area where a superimposition image can be displayed. Further, the server 100 may specify a flat space based on pixel values in the photographed image, and use this space as an empty space.

Further, in addition to the above-described feature, the display positions of the superimposition images 400-1, 400-2, and 400-3 may be determined based on the position information of the user U and/or the direction of his/her line of sight. Further, the superimposition images 400-1, 400-2, and 400-3 may be displayed in the vicinity of the corresponding exteriorly-installed facility objects or may be displayed so as to point the corresponding exteriorly-installed facility objects so that the user U can clearly recognize the corresponding relationship between the superimposition images and the respective exteriorly-installed facility objects.

Note that the superimposition information displayed on the display unit 240 may include superimposition images 410-1 and 410-2 in addition to the above-described superimposition images. Each of the superimposition images 410-1 and 410-2 may show advertisement information. The advertisement information may or may not be related to the facility of interest. For example, the generation unit 144 may specify predetermined advertisement information as superimposition images 410-1 and 410-2. Further, for example, the generation unit 144 may select an object to be advertised based on the personal information of the user U, and generate superimposition images 410-1 and 410-2 based on the selected object to be advertised. For example, when the user U is with a child, the generation unit 144 may generate a superimposition image while regarding an advertisement for a facility related to the education of children as an object to be advertised. The superimposition images 410-1 and 410-2 showing advertisement information may also be displayed in empty spaces. That is, the output control unit 145 displays the superimposition images 410-1 and 410-2 on the display unit 240 of the first user terminal 200 so that they do not overlap an area where a person is present nor an area where a predetermined object is present (or not to overlap at least one of them), and not overlap any of the superimposition images 400-1, 400-2, and 400-3 In this way, it is possible to effectively use empty spaces while ensuring the safety of walking.

According to the second example embodiment described above, the server 100 specifies a facility of interest from an exteriorly-installed facility object included in a photographed image, and outputs information related to the facility of interest to the first user terminal 200 through the second user terminal 300. In this way, the server 100 can easily provide information related to the facility of interest to the user before the user actually enters the facility of interest or purchases a commodity or a service handled by the facility of interest. Therefore, the user can easily determine whether or not to use the facility of interest. Meanwhile, facilities and the like can raise user's interest in them and effectively induce users to use the facilities and the like.

The purpose of having the server 100 provide information to the user U may be to induce the user U to use the facility, or may simply be to motivate the user U to use the facility in the future.

Figure 12:
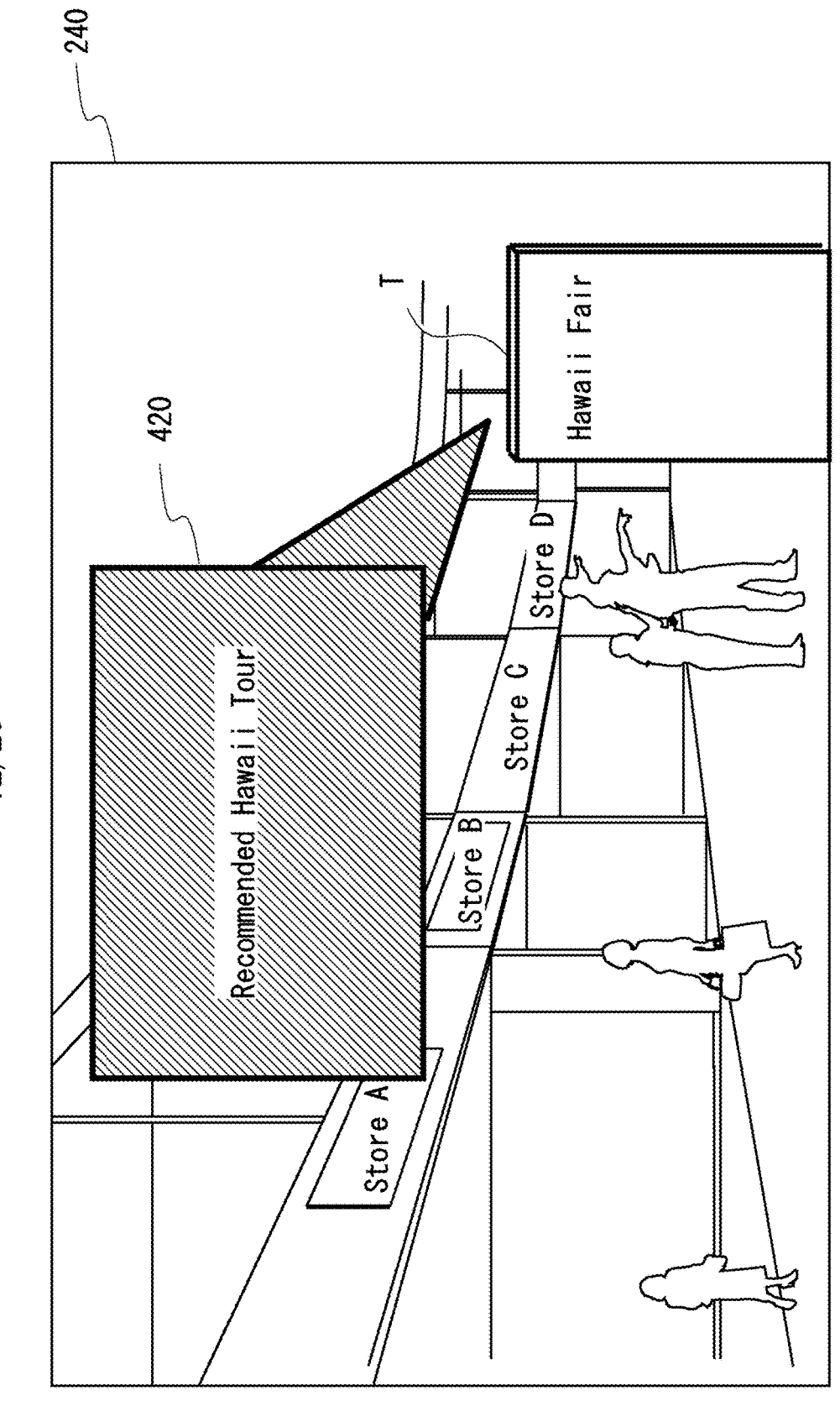
FIG. 12 shows another example of superimposition information displayed in the first user terminal according to the second example embodiment.

FIG. 12 shows another example of superimposition information displayed in the first user terminal 200 according to the second example embodiment. The specification unit 143 may detect an advertisement displayed in a display installed at a place away from a facility as an image area T of an exteriorly-installed facility object, and specify a facility which issues the advertisement or a facility related to the advertisement as a facility of interest. Then, the generation unit 144 may generate a superimposition image 420 showing facility-related information related to the facility of interest. In this drawing, the superimposition image 420 is displayed in an empty space on the display unit 240 of the first user terminal 200. As an example, when a Hawaii Fair is being held in a shopping mall, it is possible to motivate a user U to travel to Hawaii by displaying an advertisement for traveling to Hawaii or other advertisements related to Hawaii on a display installed in the venue in which the Hawaii Fair is being held.

Third Example Embodiment

Figure 13:
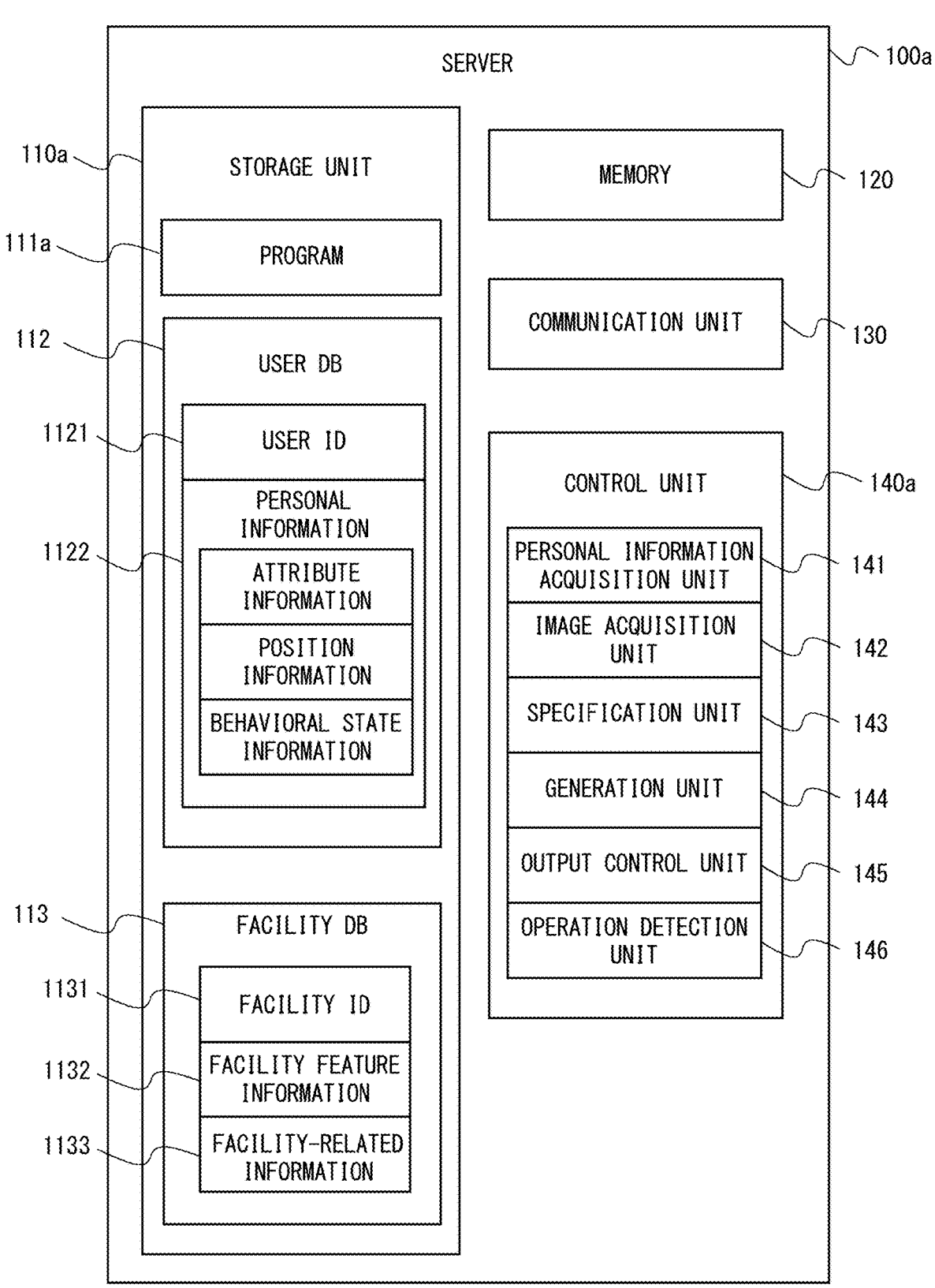
FIG. 13 is a block diagram showing a configuration of a server according to a third example embodiment.

Next, a third example embodiment according to the present disclosure will be described. The third example embodiment is characterized in that a server detects an operation from a user and performs a process according to the type or the like of the operation. FIG. 13 is a block diagram showing a configuration of a server 100a according to the third example embodiment. The server 100a includes a storage unit 110a and a control unit 140a in place of the storage unit 110 and the control unit 140. The storage unit 110a stores a program 111a in place of the program 111. The program 111a is a computer program in which processes performed in the information processing method according to the third example embodiment are implemented.

The control unit 140a includes an operation detection unit 146 in addition to the components of the control unit 140. The operation detection unit 146 is also referred to as operation detection means. The operation detection unit 146 detects a selecting operation performed by a user U. Here, it is assumed that first superimposition information is displayed on the display unit 240 of the first user terminal 200, and the image acquisition unit 142 of the server 100a has acquired a photographed image showing the view of the user U while the first superimposition information is being displayed. In this case, the operation detection unit 146 detects an operation for selecting the first superimposition information performed by the user U based on the position of a hand of the user U in the photographed image and the superimposition position of the first superimposition information in the view area (i.e., the display position of the first superimposition information on the display unit 240). The first superimposition information is an example of an aspect of the above-described superimposition information. For example, the first superimposition information may be basic information of the facility of interest, recommendation information of a commodity or a service handled by the facility of interest, or an icon or a URL of a website or an EC site of the facility of interest.

Then, the generation unit 144 generates second superimposition information based on the facility-related information of the facility of interest related to the selected first superimposition information in response to the detection of the selecting operation. The second superimposition information is different from the first superimposition information and may be detailed information of the first superimposition information. For example, in the case where the first superimposition information is recommendation information of a commodity handled by the facility of interest, the second superimposition information may be detailed information of the commodity, inventory information of the commodity, or information indicating whether a user can reserve the commodity, acquired from an EC site in which the commodity is handled. Further, for example, in the case where the first superimposition information is a store name of the facility of interest, the second superimposition information may be information indicating business hours of the facility of interest or recommendation information of a commodity handled by the facility of interest.

Then, the output control unit 145 makes (i.e., instructs) the first user terminal 200 display the superimposition information so that the second superimposition information overlaps the view area of the user U.

Figure 14:
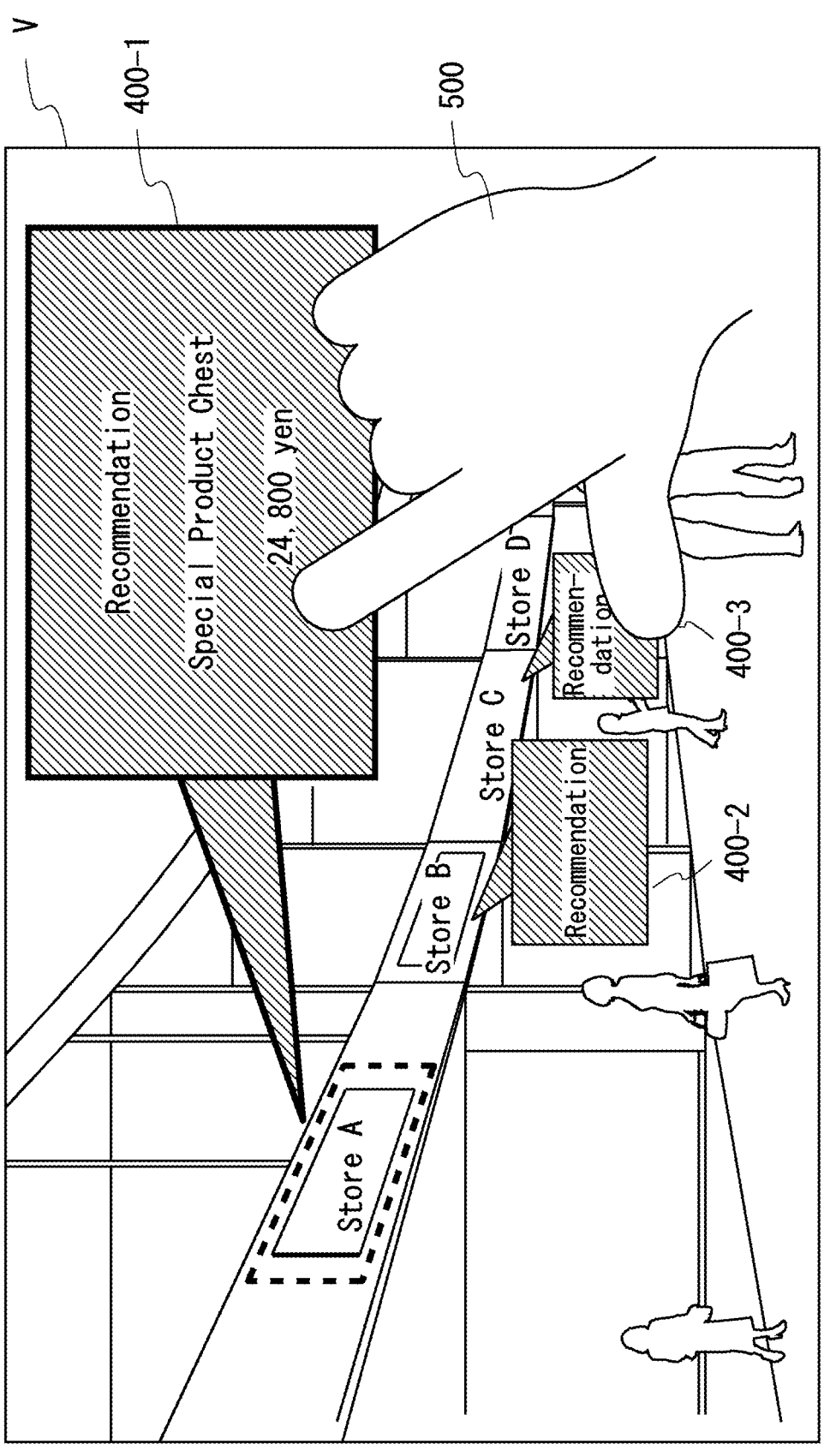
FIG. 14 is a diagram for explaining a process for detecting a selecting operation according to the third example embodiment.

FIG. 14 is a diagram for explaining a process for detecting a selecting operation according to the third example embodiment. In this drawing, a photographed image V of the view of a user U when superimposition images 400-1 to 400-3 are displayed as first superimposition information is shown. Note that an image area in which a hand of the user U is shown (i.e., a hand area 500) is included in the photographed image V. Note that although the superimposition images 400-1 to 400-3 are shown in this drawing for the sake of convenience, these superimposition images 400 do not necessarily have to be included in the photographed image V.

The operation detection unit 146 first detects the hand area 500 from the photographed image V and then detects a fingertip from the hand area 500. Then, the operation detection unit 146 determines whether the position of the fingertip corresponds to the display position of any of the superimposition images 400. In this drawing, the operation detection unit 146 determines that the position of the fingertip corresponds to the display position of the superimposition image 400-1. Therefore, the operation detection unit 146 determines that the superimposition image 400-1 is pressed (selected) by the user U. Note that in order to avoid the detection of a false operation, the operation detection unit 146 may detect (i.e., determine) that a selecting operation has been performed by the user U only when it determines that, in addition to the detection of the state where the position of the fingertip corresponds to the display position of the superimposition image 400-1, a predetermined operation has been performed before or/and after this state. The predetermined operation may be, for example, placing the fingertip at the position corresponding to the display position of the superimposition image 400-1 for a predetermined time, or may be a clicking operation performed by a finger.

Then, in response to the detection of the selecting operation, the generation unit 144 may access an EC site of the facility of interest (store A) corresponding to the selected superimposition image 400-1 and acquire detailed information of the commodity corresponding to the superimposition image 400-1. Then, the generation unit 144 generates second superimposition information based on the acquired detailed information.

Figure 15:
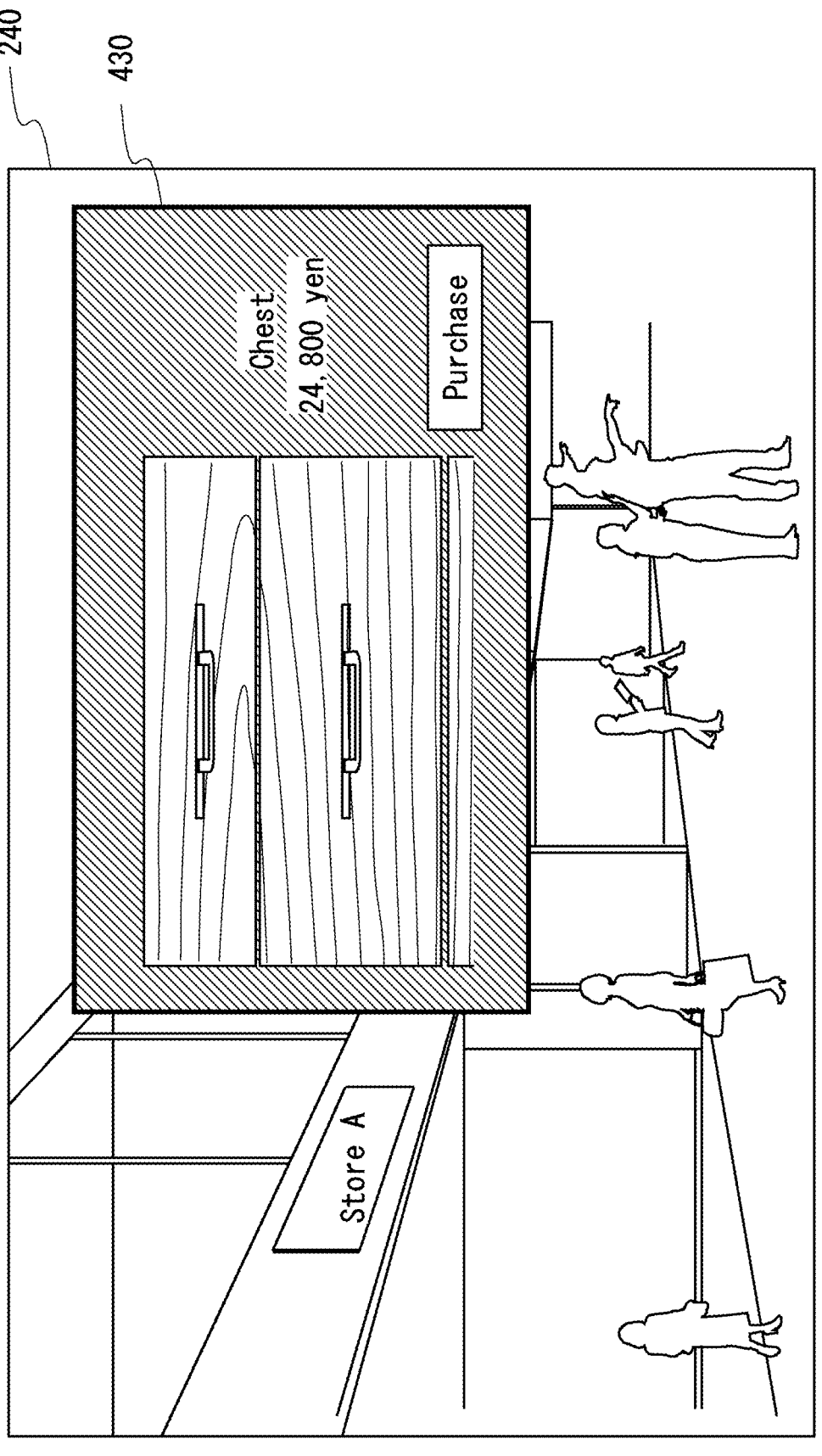
FIG. 15 shows an example of second superimposition information displayed in a first user terminal according to the third example embodiment.

FIG. 15 shows an example of second superimposition information displayed in the first user terminal 200 according to the third example embodiment. A superimposition image 430 is displayed as the second superimposition information on the display unit 240. As an example, the superimposition image 430 includes an image of a commodity, a commodity name, a price, and a purchase button for the commodity. Note that the user U may perform a selecting operation on the purchase button by moving his/her fingertip to the display position of the purchase button. After detecting the selecting operation on the purchase button, the operation detection unit 146 may proceed with a purchasing process for the user U in the EC site.

As described above, according to the third example embodiment, the server 100a detects a selecting operation performed by the user U based on the position of a hand of the user U in the photographed image and the superimposition position of superimposition information, and performs a process corresponding to the selecting operation. In this way, the user U can easily acquire more detailed information of the superimposition information in a touchless manner.

Fourth Example Embodiment

Next, a fourth example embodiment according to the present disclosure will be described. The fourth example embodiment is characterized in that a server detects a free time of a user U and provides information to the user U in his/her free time.

Figure 16:
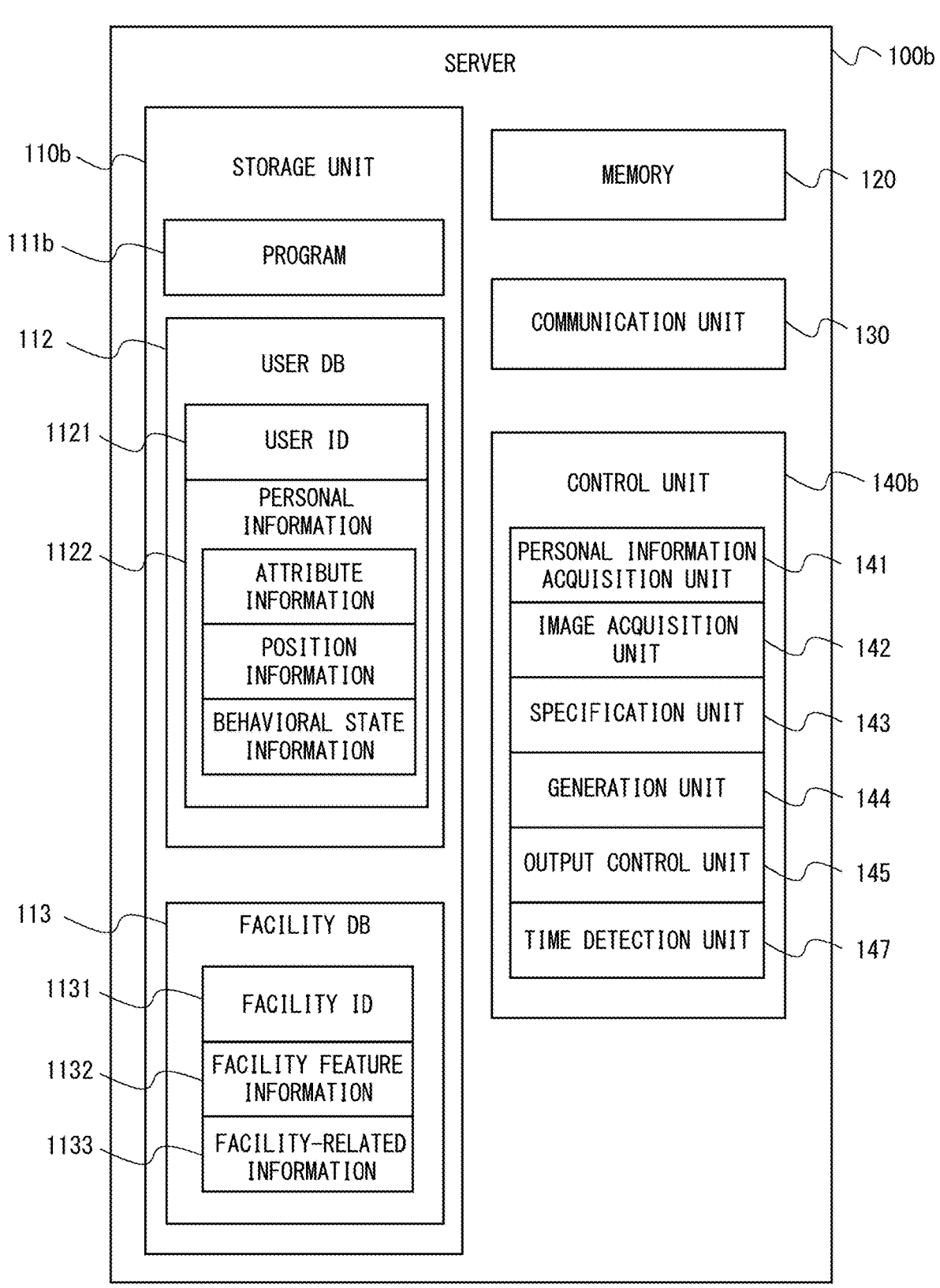
FIG. 16 is a block diagram showing a configuration of a server according to a fourth example embodiment.

FIG. 16 is a block diagram showing a configuration of a server 100b according to the fourth example embodiment. The server 100b includes a storage unit 110b and a control unit 140b in place of the storage unit 110 and the control unit 140. The storage unit 110b stores a program 111b in place of the program 111. The program 111b is a computer program in which processes performed in the information processing method according to the fourth example embodiment are implemented.

The control unit 140b includes a time detection unit 147 in addition to the components of the control unit 140. The time detection unit 147 is also referred to as time detection means. The time detection unit 147 detects a free time of a user U based on at least one of a photographed image acquired by the image acquisition unit 142, position information of the user U, behavioral state information thereof, and schedule information thereof. The free time may refer to a time when the user U is simply in a moving state or at a standstill, or may refer to a time when the user U is in a state other than specific states (e.g., "during a sightseeing" or "during a meal"). For example, the time detection unit 147 determines that a free time of the user U is detected when it is determined that the user U is in a train or an elevator from the photographed image acquired by the image acquisition unit 142 or the position information of the user U.

Then, in response to the detection of the free time of the user U, the generation unit 144 generates advertisement information. The advertisement information may be similar to the above-described advertisement information. That is, the advertisement information may be determined in advance or generated by the generation unit 144 by using the personal information of the user U. Then, the output control unit 145 makes (i.e., instructs) the first user terminal 200 to display the generated information so as to overlap the view area.

Figure 17:
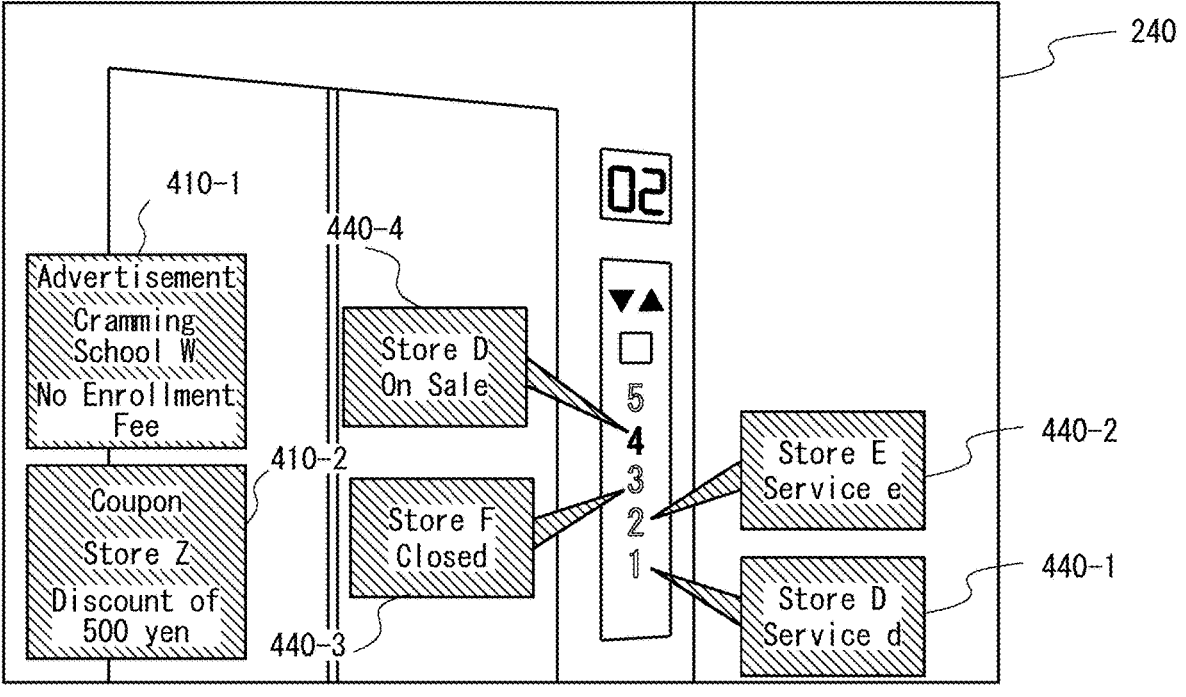
FIG. 17 shows an example of superimposition information displayed in a first user terminal according to the fourth example embodiment.

FIG. 17 shows an example of superimposition information displayed in the first user terminal 200 according to the fourth example embodiment. The time detection unit 147 determines that the user U is in an elevator and thereby detects a free time of the user U. Therefore, superimposition images 410-1 and 410-2 showing advertisement information are displayed on the display unit 240.

Note that when a control panel of the elevator is shown in the photographed image, the generation unit 144 may generate superimposition images 440-1 to 440-4 showing pieces of facility-related information corresponding to facilities on respective floors on the control panel. The output control unit 145 may make (i.e., instruct) the first user terminal 200 display the superimposition images 440-1 to 440-4 in the vicinity of the positions corresponding to the respective floors on the control panel of the elevator in the view area.

As described above, according to the fourth example embodiment, the server 100b can effectively use a free time of the user U and provide, to the user U, information useful to the user U himself/herself or useful to the facility.

Fifth Example Embodiment

Next, a fifth example embodiment according to the present disclosure will be described. The fifth example embodiment is characterized in that a server measures how much information provided to a user U has contributed to (i.e., influenced) the behavior of the user U.

Figure 18:
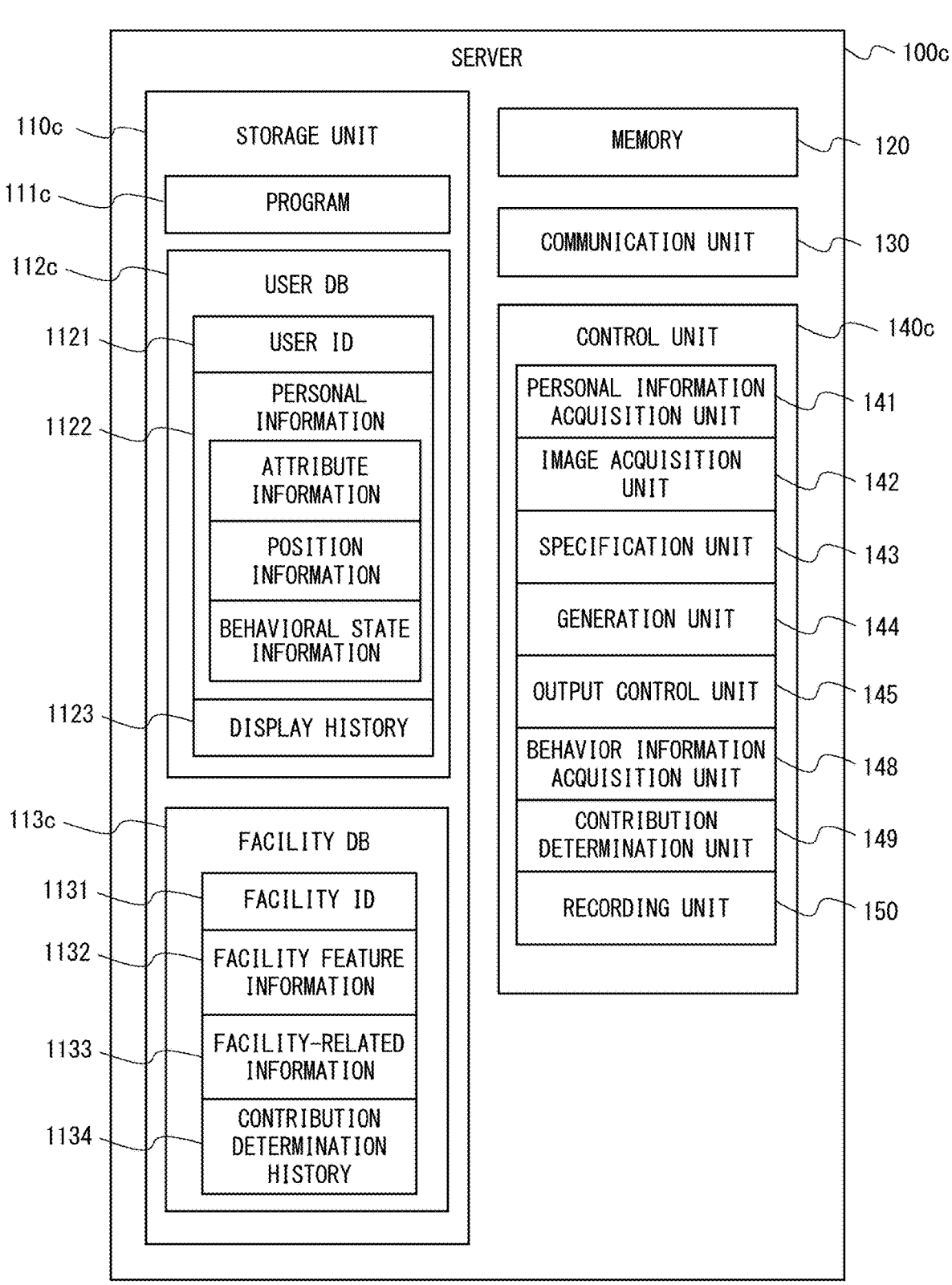
FIG. 18 is a block diagram showing a configuration of a server according to a fifth example embodiment.

FIG. 18 is a block diagram showing a configuration of a server 100c according to the fifth example embodiment. The server 100c includes a storage unit 110c and a control unit 140c in place of the storage unit 110 and the control unit 140. The storage unit 110c stores a program 111c, a user DB 112c, and a facility DB 113c. The program 111c is a computer program in which processes performed in the information processing method according to the fifth example embodiment are implemented.

The user DB 112c stores a display history 1123 in addition to the personal information 1122 as information corresponding to the user ID 1121. The display history 1123 is a history of superimposition information displayed in the first user terminal 200 of the user U having the user ID 1121.

The facility DB 113c stores a contribution determination history 1134 in addition to the facility feature information 1132 and the facility-related information 1133 as information associated with the facility ID 1131. The contribution determination history 1134 is a history of contribution determination results in contribution determination processes (which will be described later).

The control unit 140c includes a behavior information acquisition unit 148, a contribution determination unit 149, and a recording unit 150 in addition to the components of the control unit 140.

The behavior information acquisition unit 148 acquires behavior information of a user U. The behavior information is information indicating that the user U has performed a predetermined behavior. The behavior information includes at least a type of behavior and information indicating an object of the behavior.

For example, when the type of behavior is a fact that the user U has used a facility (e.g., entered a facility or purchased a commodity in a facility), the behavior information may be referred to as use information. In this case, the information indicating the object of the behavior may be the facility ID of the used facility. The behavior information acquisition unit 148 may acquire behavior information of the user U from the second user terminal 300 or a facility terminal installed in the facility.

When behavior information (use information) is acquired from the facility terminal, the facility terminal may be a face authentication terminal that performs face authentication of the user U. When the user U has entered the facility or purchased a commodity or a service in the facility, the facility terminal may specify the user ID from the face image of the user U and transmit the specified user ID to the server 100c together with the behavior information. Further, the face authentication may be performed in the server 100c. In this case, when the user U has entered the facility or purchased a commodity or a service in the facility, the facility terminal may take a face image of the user U and transmit the taken face image to the server 100c. Then, the server 100c may specify the user ID based on the face image acquired from the facility terminal.

Further, when behavior information (use information) is acquired from the second user terminal 300, the second user terminal 300 may transmit position information such as GPS (Global Positioning System) information and Bluetooth beacon information to the server 100c. The behavior information acquisition unit 148 may determine whether or not the use information has been acquired based on the received information.

Further, for example, when the type of behavior is a fact that the user U has looked at the superimposition information, the behavior information may be referred to as line-of-sight information. In this case, the information indicating the object of the behavior may be the facility ID on which the superimposition information is based. Further, for example, when the type of behavior is a fact that the user U has performed a selecting operation, the behavior information may be referred to as selecting operation information. In this case, the information indicating the object of the behavior may be the facility ID on which the selected superimposition information is based. Note that when the behavior information is selecting operation information, the server 100c may include an operation detection unit 146. When the behavior information is line-of-sight information or selecting operation information, the behavior information acquisition unit 148 may acquire behavior information and a user ID of the user U from the second user terminal 300.

The behavior information acquisition unit 148 supplies the acquired behavior information of the user U and the user ID to the contribution determination unit 149.

When the behavior information acquisition unit 148 has acquired behavior information, the contribution determination unit 149 refers to the display history 1123 associated with the user ID in the user DB 112. Then, the contribution determination unit 149 calculates, based on the behavior information, the degree of contribution (e.g., the degree of influence) to the behavior of the user by the superimposition information displayed in the first user terminal 200. Then, the contribution determination unit 149 determines whether or not the calculated degree of contribution is equal to or greater than a predetermined threshold.

For example, when the behavior information acquisition unit 148 has acquired use information as behavior information, the contribution determination unit 149 determines whether or not the facility used by the user U is a facility corresponding to the superimposition information displayed in the first user terminal 200. Further, for example, when the behavior information acquisition unit 148 has acquired line-of-sight information of the user U as behavior information, the contribution determination unit 149 determines whether or not the superimposition information displayed by the first user terminal 200 is present in the direction of the line of sight of the user U. Further, for example, when the behavior information acquisition unit 148 has acquired selecting operation information as behavior information, the contribution determination unit 149 determines whether or not the object selected by the user U is the superimposition information displayed in the first user terminal 200. Then, when the determination result is positive, the contribution determination unit 149 may calculate (i.e., determine) the degree of contribution is equal to or greater than the predetermined threshold.

Note that the contribution determination unit 149 may change the degree of contribution according to the use state of the user U, for example, according to whether or not the user U has entered but has not purchased any commodity, or according to the amount of money of the purchase (e.g., the total price of purchased commodities and services). Further, the contribution determination unit 149 may change the degree of contribution according to the time during which the user U has looked at the relevant information.

The contribution determination unit 149 supplies, to the recording unit 150, information as to whether the degree of contribution is equal to or greater than the predetermined threshold as a contribution determination result.

The recording unit 150 records, in the user DB 112, a display history of display on the first user terminal 200 by the output control unit 145. Further, the recording unit 150 may record, when voice guidance is provided, voice data in the user DB 112 together with the display history, and may also record the purchase records of the user U therein. Further, the recording unit 150 records the contribution determination result acquired from the contribution determination unit 149 in the facility DB 113.

Note that the server 100c may transmit the display history, the voice data, or the purchase records stored in the user DB 112 to the second user terminal 300 at a predetermined timing so that the user U can look back on them later. The second user terminal 300 may output new information based on the received display history, the voice data, or the purchase records. For example, the second user terminal 300 may display a list of facilities on which the superimposition information is based and/or a list of images of exteriorly-installed facility objects, and/or may display recommendation information of a facility based on the purchase records.

Figure 19:
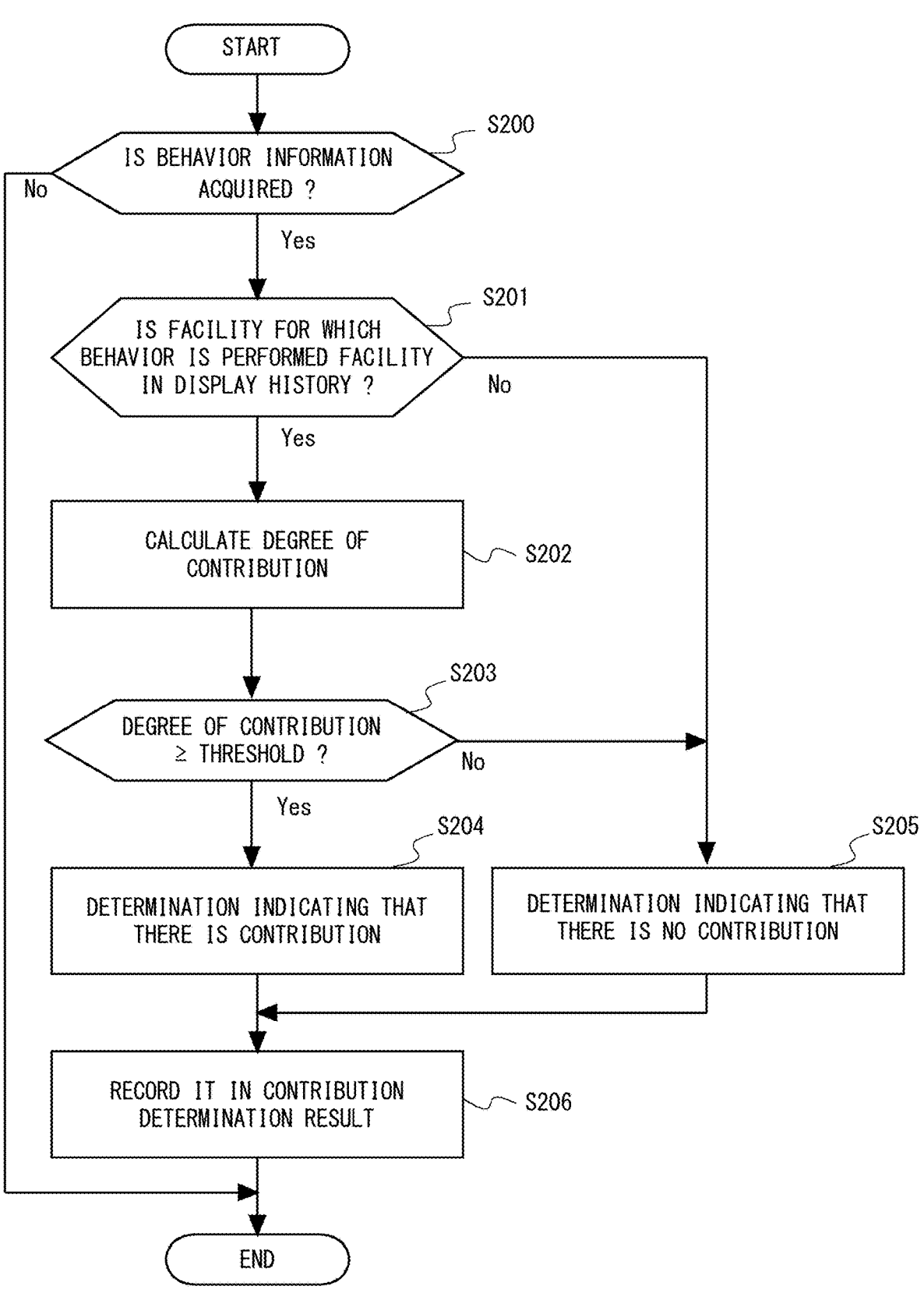
FIG. 19 is a flowchart showing an example of a contribution determination process according to the fifth example embodiment.

FIG. 19 is a flowchart showing an example of a contribution determination process according to the fifth example embodiment. Firstly, the behavior information acquisition unit 148 determines whether or not behavior information of a user U has been acquired from the second user terminal 300 or a facility terminal (S200). When the behavior information acquisition unit 148 has acquired the behavior information of the user U (Yes at S200), it supplies the acquired behavior information to the contribution determination unit 149 and proceeds to a process in a step S201. Then, the contribution determination unit 149 determines whether or not the facility for which behavior is performed, included in the behavior information is a facility included in the display history associated with the user ID (S201). When the contribution determination unit 149 determines that the facility for which behavior is performed is a facility included in the display history (Yes at S201), it calculates the degree of contribution for the facility (S202). Then, the contribution determination unit 149 determines whether or not the degree of contribution is greater than or equal to a predetermined threshold (S203). When it is determined that the degree of contribution is greater than or equal to the predetermined threshold (Yes at S203), the contribution determination unit 149 determines that the display has brought about a change in behavior of the user U and thereby determines that "there has been a contribution" (S204). The contribution determination unit 149 records the contribution determination result in the contribution determination history 1134 stored in the facility DB 113 (S206). On the other hand, when the contribution determination unit 149 does not determine that the facility for which behavior is performed is a facility included in the display history (No at S201) or determines that the degree of contribution is less than the predetermined threshold (No at S203), it determines "there has been no contribution" (S205). Then, the contribution determination unit 149 records the contribution determination result in the contribution determination history 1134 stored in the facility DB 113 (S206).

As described above, according to the fifth example embodiment, the server 100c measures the degree of contribution of superimposition information displayed in the first user terminal 200 to the behavior of the user U and records whether or not there is a contribution. In this way, it is possible to easily measure the interest of the user U and easily measure the effect of the display (e.g., the influence of the display on the change of the behavior).

Note that the server 100c may collect a fee from a facility having a facility ID associated with the above-described superimposition information or the like based on the contribution determination history. The amount of the fee may be determined according to the degree of contribution.

Note that the server 100c may measure a degree of contribution of the above-described advertisement information in addition to or instead of the degree of contribution by the superimposition information. In this case, the "superimposition information" in the description of the above-described fifth example embodiment may be regarded as "advertisement information".

Sixth Example Embodiment

Next, a sixth example embodiment according to the present disclosure will be described. The sixth example embodiment is characterized in that a server uses personal information of a companion of a user U (e.g., a person who is traveling with a user U) when it provides information to the user U. An information processing system 1000 according to the sixth example embodiment has basically the same configuration and functions as those of the information processing system 1000 according to the first example embodiment. However, in the sixth example embodiment, the second user terminal 300 of the user U transmits personal information of a companion of the user U to the server 100 in addition to or instead of the personal information of the user U. For example, an area for entering personal information of a companion may be included the input screen for personal information shown in FIG. 8.

The personal information acquisition unit 141 of the server 100 acquires personal information of the user U and personal information of his/her companion from the second user terminal 300 of the user U. Then, the generation unit 144 generates superimposition information based on the personal information of the user U, the personal information of the companion, and facility-related information related to the facility of interest. In this way, the server 100 can provide information in which not only the personal information of the user U himself/herself but also the personal information, such as taste and preferences, of the companion is taken into consideration.

Further, the personal information acquisition unit 141 may acquire, from the second user terminal 300, information about the degree of importance of the personal information of the companion relative to that of the personal information of the user U in addition to the personal information of the user U and the personal information of the companion.

Figure 20:
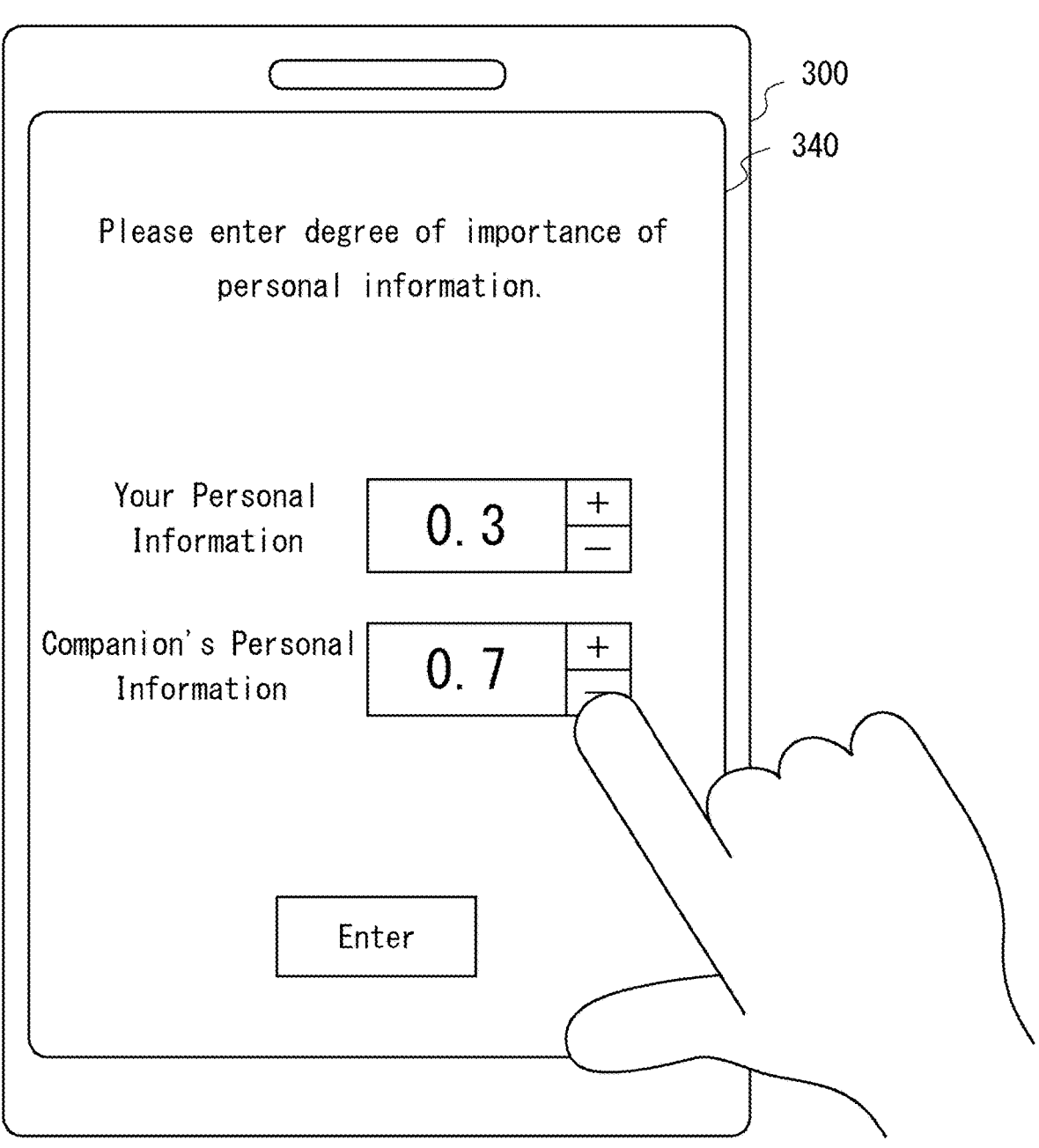
FIG. 20 shows an example of a screen for entering a degree of importance of personal information to be displayed in a second user terminal according to a sixth example embodiment.

Note that the output control unit 145 of the server 100 makes (i.e., instructs) the second user terminal 300 display an input screen for the degree of importance in a step S101 shown in FIG. 7. FIG. 20 shows an example of an input screen for the degree of importance of personal information displayed in the second user terminal 300 according to the sixth example embodiment.

As shown in FIG. 20, on the display unit 340, an input area for the degree of importance of the personal information of the user U and an input area for the degree of importance of the personal information of the companion are displayed. In this input screen, the value of each of the degrees of importance can be changed in response to an adding operation or a subtracting operation from the user U. Note that in this input screen, the ratio of the degree of importance of personal information of the user U and the ratio of the degree of importance of personal information of the companion may be adjusted so that the total of these ratios becomes one. When there are a plurality of companions, the ratio of the degree of importance of personal information of the user U and the ratios of the degrees of importance of personal information of the companions may be adjusted so that the total of these ratios becomes one. Alternatively, these adjustments may be made by the personal information acquisition unit 141 of the server 100. Further, an input area for "Enter" is displayed on the display unit 340. In response to the selection of these input areas by the user U, the second user terminal 300 transmits the input degree of importance of personal information of the user U and that of the companion to the server 100, which have been input in the input areas, together with the user ID.

Note that the input screen for the degree of importance may be displayed not only on the display unit 340 of the second user terminal 300 but also on the display unit 240 of the first user terminal 200. In this case, the server 100 may include an operation detection unit 146. When the user U performs a predetermined operation in the real space in response to the display of an input screen for the degree of importance on the display unit 240, the operation detection unit 146 may detect an input operation from the photographed image and perform a process according to the input operation.

When the personal information acquisition unit 141 acquires the personal information of the companion and information about the degree of importance, the generation unit 144 sets a priority for each of pieces of facility-related information related to the facility of interest based on the personal information of the user U, the personal information of the companion, and the degree of importance. For example, the generation unit 144 first generates personal information as that for a group from the personal information of the user U and the personal information of the companion which has been weighted by the degree of importance. Then, the generation unit 144 sets a priority for each of pieces of facility-related information of the facility of interest based on that piece of facility-related information and the personal information as that for the group.

As described above, according to the sixth example embodiment, the server 100 can set a priority based on personal information weighted by the degree of importance between the personal information of the user U and that of the companion. Therefore, it is possible to provide, to the user U, information that reflects the intention of the group more appropriately.

Note that the above-described example embodiments have been described as hardware configurations, but the present disclosure is not limited to the hardware configurations. The present disclosure may also be implemented by causing a CPU to execute a computer program.

In the above-described examples, the program includes a set of instructions (or software codes) that, when read into a computer, causes the computer to perform one or more of the functions described in the example embodiments. The program may be stored in a non-transitory computer readable medium or in a physical storage medium. By way of example rather than limitation, a computer readable medium or a physical storage medium may include a random-access memory (RAM), a read-only memory (ROM), a flash memory, a solid-state drive (SSD), or other memory technology, a CD-ROM, a digital versatile disc (DVD), a Bluray (registered trademark) disc or other optical disc storages, a magnetic cassette, magnetic tape, and a magnetic disc storage or other magnetic storage devices. The program may be transmitted on a transitory computer readable medium or a communication medium. By way of example rather than limitation, the transitory computer readable medium or the communication medium may include electrical, optical, acoustic, or other forms of propagating signals.

Note that the present disclosure is not limited to the above-described example embodiments, and they may be modified as appropriate without departing from the scope and spirit of the disclosure. For example, in the above-described example embodiment, information is transmitted and received between the server 100 and the second user terminal 300 through the second user terminal 300 connected to the network N. However, the first user terminal 200 may be connected to the network N, and the server 100 may communicate with the first user terminal 200 without the second user terminal 300 interposed therebetween. In this case, the server 100 may acquire personal information by displaying an input screen for personal information on the first user terminal 200 and detecting an input operation for personal information based on a photographed image in which the user U has performed a predetermined operation. Further, the information processing system 1000 may include, instead of the first user terminal 200 and the second user terminal 300, a user terminal in which the functions of the first user terminal 200 and those of the second user terminal 300 are integrated.

Further, the generation unit 144 of the server 100 may generate superimposition information based on the degree of congestion in the facility of interest in addition to the facility-related information associated with the facility of interest and the personal information. For example, the generation unit 144 may include (i.e., incorporate) information about the degree of congestion in the superimposition information generated based on the priority. Further, for example, the generation unit 144 may set a priority of the facility-related information related to the facility of interest based on the facility-related information, the personal information, and the degree of congestion in the facility of interest. When the generation unit 144 uses the degree of congestion, the server 100 may further include a degree-of-congestion acquisition unit (not shown) that acquires the degree of congestion in each facility. In this way, the server 100 provides information in which the degree of congestion is taken into consideration, thus making it easier for the user U to determine whether or not to use the facility before he/she actually uses the facility. Therefore, it is possible to increase the satisfaction of the user.

Further, in the above-described example embodiment, the personal information acquisition unit 141 of the server 100 acquires the personal information of the user U and the companion (hereinafter also referred to as the user and the like) from the user terminal such as the second user terminal 300. However, the personal information acquisition unit 141 may instead acquire the personal information from an external apparatus that is connected to the network N and stores part or all of personal information of the user and the like.

For example, the external apparatus may operate a schedule management application and accumulate pieces of schedule information of the user and the like acquired through such operations. Then, the external apparatus may transmit the user ID and the schedule information to the server 100 through the network N at a predetermined timing. Further, for example, the external apparatus may operate an application for managing a purchase history and store purchase histories of the user and the like acquired through such operations.

Further, a face authentication terminal may be installed in each facility, and when the user and the like visit a facility, the face authentication terminal may transmit the user ID and a visit history to the server 100 through the network N. Then, the server 100 may register the visit history as a behavior history in the user DB 112 while associating it with the user ID.

Further, a face payment terminal may be installed in each facility, and when a user or the like makes a payment at a store, the face settlement terminal transmits the user ID and the payment history to the server 100 through the network N. Then, the server 100 may register the payment history as a purchase history in the user DB 112 while associating it with the user ID.

Further, the first to sixth example embodiments may be combined with one another as desired.

The whole or part of the example embodiments disclosed above can be described as, but not limited to, the following supplementary notes.

(Supplementary Note 1)

An information processing apparatus comprising:

image acquisition means for acquiring a photographed image generated by photographing a user's view by a user terminal;

specification means for detecting an exteriorly-installed facility object related to a facility from the photographed image and specifying a facility of interest based on the detected exteriorly-installed facility object;

generation means for generating superimposition information based on facility-related information related to the facility of interest; and output control means for making the user terminal display the superimposition information in such a manner that the superimposition information overlaps a view area indicating the user's view.

(Supplementary Note 2)

The information processing apparatus described in Supplementary note 1, further comprising personal information acquisition means for acquiring personal information of at least one of the user and a companion of the user, wherein the generation means generates the superimposition information based on facility-related information related to the facility of interest and the personal information.

(Supplementary Note 3)

The information processing apparatus described in Supplementary note 2, wherein the personal information includes at least one of attribute information, position information, a behavior history, a current behavioral state, a purchase history, and schedule information.

(Supplementary Note 4)

The information processing apparatus described in Supplementary note 2 or 3, wherein when a plurality of facilities of interest are specified from the photographed image or when there are a plurality of pieces of facility-related information related to the facility of interest, the generation means sets a priority for each of pieces of facility-related information related to the facility of interest based on the personal information and generates the superimposition information based on the priorities.

(Supplementary Note 5)

The information processing apparatus described in any one of Supplementary notes 2 to 4, wherein the personal information acquisition means acquires personal information of the user, personal information of the companion, and a degree of importance of the personal information of the companion relative to that of the personal information of the user, and the generation means sets a priority to each of pieces of facility-related information related to the facility of interest based on the personal information of the user, the personal information of the companion, and the degree of importance.

(Supplementary Note 6)

The information processing apparatus described in any one of Supplementary notes 1 to 5, wherein the generation means specifies information of a commodity or a service acquired from a website of the facility of interest as the facility-related information.

(Supplementary Note 7)

The information processing apparatus described in any one of Supplementary notes 1 to 6, further comprising operation detection means for detecting a selecting operation for the first superimposition information performed by the user based on a position of a hand of the user in the photographed image and a position at which the first superimposition information is superimposed in the view area, wherein the generation means generates, in response to the detection of the selecting operation, second superimposition information based on the facility-related information of the facility of interest related to the selected first superimposition information, and the output control means makes the user terminal display the second superimposition information so that the second superimposition information overlaps the view area.

(Supplementary Note 8)

The information processing apparatus described in any one of Supplementary notes 1 to 7, wherein the output control means makes the user terminal display the superimposition information so that the superimposition information does not overlap an area in the view area where at least one of a person and a predetermined object is present.

(Supplementary Note 9)

The information processing apparatus described in any one of Supplementary notes 1 to 8, further comprising time detection means for detecting a free time of the user based on at least one of the photographed image and the position information of the user, wherein the output control means makes the user terminal display predetermined advertisement information so that the advertisement information overlaps the view area.

(Supplementary Note 10)

The information processing apparatus described in any one of Supplementary notes 1 to 9, further comprising:

contribution determination means for, when behavior information indicating that the user has performed a predetermined behavior is acquired, calculating a degree of contribution to the behavior by the superimposition information displayed by the user terminal based on the behavior information, and determining whether or not the degree of contribution is equal to or greater than a predetermined threshold, and recording means for recording a result of the determination.

(Supplementary Note 11)

The information processing apparatus described in Supplementary note 10, wherein when use information indicating that the user has used a facility is acquired as the behavior information, the contribution determination means determines whether or not the facility used by the user is a facility corresponding to the superimposition information displayed by the user terminal.

(Supplementary Note 12)

An information processing system comprising:

a user terminal used by a user; and an information processing apparatus, wherein the information processing apparatus comprises:

image acquisition means for acquiring a photographed image generated by photographing a user's view by a user terminal;

specification means for detecting an exteriorly-installed facility object related to a facility from the photographed image and specifying a facility of interest based on the detected exteriorly-installed facility object;

generation means for generating superimposition information based on facility-related information related to the facility of interest; and output control means for making the user terminal display the superimposition information in such a manner that the superimposition information overlaps a view area indicating the user's view.

(Supplementary Note 13)

The information processing system described in Supplementary note 12, wherein the user terminal comprises a first user terminal attached to a body of the user and a second user terminal configured to communicate with the information processing apparatus and the first user terminal, and in the information processing apparatus, the image acquisition means acquires the photographed image from the first user terminal through the second user terminal, and the output control means makes, through the second user terminal, a display unit of the first user terminal display the superimposition information.

(Supplementary Note 14)

An information processing method comprising:

acquiring a photographed image generated by photographing a user's view by a user terminal;

detecting an exteriorly-installed facility object related to a facility from the photographed image and specifying a facility of interest based on the detected exteriorly-installed facility object;

generating superimposition information based on facility-related information related to the facility of interest; and making the user terminal display the superimposition information in such a manner that the superimposition information overlaps a view area indicating the user's view.

(Supplementary Note 15)

A non-transitory computer readable medium storing a program for causing a computer to perform:

an image acquisition process for acquiring a photographed image generated by photographing a user's view by a user terminal;

a specification process for detecting an exteriorly-installed facility object related to a facility from the photographed image and specifying a facility of interest based on the detected exteriorly-installed facility object;

a generation process for generating superimposition information based on facility-related information related to the facility of interest; and an output control process for making the user terminal display the superimposition information in such a manner that the superimposition information overlaps a view area indicating the user's view.

REFERENCE SIGNS LIST

10 INFORMATION PROCESSING APPARATUS
12, 142 IMAGE ACQUISITION UNIT
13, 143 SPECIFICATION UNIT
14, 144 GENERATION UNIT
15, 145 OUTPUT CONTROL UNIT
100, 100a, 100b, 100c SERVER (INFORMATION PROCESSING APPARATUS)
110, 110a, 110b, 110c STORAGE UNIT
111, 111a, 111b, 111c PROGRAM
112, 112c USER DB
1121 USER ID
1122 PERSONAL INFORMATION
1123 DISPLAY HISTORY
113, 113c FACILITY DB
1131 FACILITY ID
1132 FACILITY FEATURE INFORMATION
1133 FACILITY-RELATED INFORMATION
1134 CONTRIBUTION DETERMINATION HISTORY
120 MEMORY
130 COMMUNICATION UNIT
140, 140a, 140b, 140c CONTROL UNIT
141 PERSONAL INFORMATION ACQUISITION UNIT
146 OPERATION DETECTION UNIT
147 TIME DETECTION UNIT
148 BEHAVIOR INFORMATION ACQUISITION UNIT
149 CONTRIBUTION DETERMINATION UNIT
150 RECORDING UNIT
200 FIRST USER TERMINAL
210 CAMERA
220 STORAGE UNIT
230 COMMUNICATION UNIT
240 DISPLAY UNIT
250 INPUT UNIT
260 CONTROL UNIT
300 SECOND USER TERMINAL
310 CAMERA
320 STORAGE UNIT
330 COMMUNICATION UNIT
340 DISPLAY UNIT
360 CONTROL UNIT
400, 410, 420, 430 SUPERIMPOSITION IMAGE
500 HAND AREA
1000 INFORMATION PROCESSING SYSTEM
U USER
N NETWORK
T IMAGE AREA
V PHOTOGRAPHED IMAGE

The invention claimed is:
1. An information processing apparatus comprising:
at least one memory storing instructions, and
at least one processor configured to execute the instructions to:
    acquire a photographed image generated by photographing a user's view by a user terminal;
    detect an exteriorly-installed facility object related to a facility from the photographed image and specify a facility of interest based on the detected exteriorly-installed facility object;

generate superimposition information based on facility-related information related to the facility of interest, among a plurality of pieces of facility-related information; and
    control the user terminal to display the superimposition information in such a manner that the superimposition information overlaps a view area indicating the user's view,
wherein the at least one processor is further configured to execute the instructions to:
    acquire personal information of the user, personal information of a companion of the user, and a degree of importance of the personal information of the companion relative to that of the personal information of the user, and
    set a priority to each of the plurality of pieces of facility-related information based on the personal information of the user, the personal information of the companion, and the degree of importance.
2. The information processing apparatus according to claim 1, wherein
the at least one processor is further configured to execute the instructions to generate the superimposition information based on facility-related information related to the facility of interest and at least one of the personal information of the user and the personal information of the companion.
3. The information processing apparatus according to claim 2, wherein the personal information of the user or the personal information of the companion includes at least one of attribute information, position information, a behavior history, a current behavioral state, a purchase history, and schedule information.
4. The information processing apparatus according to claim 2, wherein in a case in which a plurality of facilities of interest are specified from the photographed image or in a case in which the plurality of pieces of facility-related information related to the facility of interest are provided, the at least one processor configured to execute the instructions to generate the superimposition information based on the priority set to each of the plurality of pieces of facility-related information.
5. The information processing apparatus according to claim 1, wherein the at least one processor configured to execute the instructions to specify information of a commodity or a service acquired from a website of the facility of interest as the facility-related information.
6. The information processing apparatus according to claim 1, the at least one processor configured to further execute the instructions to detect a selecting operation for the first superimposition information performed by the user based on a position of a hand of the user in the photographed image and a position at which the first superimposition information is superimposed in the view area, wherein
    the at least one processor configured to execute the instructions to generate, in response to the detection of the selecting operation, second superimposition information based on the facility-related information of the facility of interest related to the selected first superimposition information, and
    the at least one processor configured to execute the instructions to make the user terminal display the second superimposition information so that the second superimposition information overlaps the view area.
7. The information processing apparatus according to claim 1, wherein the at least one processor configured to execute the instructions to make the user terminal display the superimposition information so that the superimposition information does not overlap an area in the view area where at least one of a person and a predetermined object is present.

8. The information processing apparatus according to claim 1, the at least one processor configured to further execute the instructions to detect a free time of the user based on at least one of the photographed image and position information of the user, wherein the at least one processor configured to execute the instructions to make the user terminal display predetermined advertisement information so that the advertisement information overlaps the view area.

9. The information processing apparatus according to claim 1, the at least one processor configured to further execute the instructions to:

when behavior information indicating that the user has performed a predetermined behavior is acquired, calculate a degree of contribution to the behavior by the superimposition information displayed by the user terminal based on the behavior information, and determine whether or not the degree of contribution is equal to or greater than a predetermined threshold, and record a result of the determination.

10. The information processing apparatus according to claim 9, wherein when use information indicating that the user has used a facility is acquired as the behavior information, the at least one processor configured to execute the instructions to determine whether or not the facility used by the user is a facility corresponding to the superimposition information displayed by the user terminal.

11. An information processing system comprising:

a user terminal used by a user and configured to photograph a user's view; and an information processing apparatus comprising:

at least one memory storing instructions, and at least one processor configured to execute the instructions to:

acquire a photographed image generated by the user terminal;

detect an exteriorly-installed facility object related to a facility from the photographed image and specify a facility of interest based on the detected exteriorly-installed facility object;

generate superimposition information based on facility-related information related to the facility of interest, among a plurality of pieces of facility-related information; and control the user terminal to display the superimposition information in such a manner that the superimposition information overlaps a view area indicating the user's view, wherein the at least one processor is further configured to execute the instructions to:

acquire personal information of the user, personal information of a companion of the user, and a degree of importance of the personal information of the companion relative to that of the personal information of the user, and set a priority to each of the plurality of pieces of facility-related information based on the personal information of the user, the personal information of the companion, and the degree of importance.

12. The information processing system according to claim 11, wherein the user terminal comprises a first user terminal attached to a body of the user and a second user terminal configured to communicate with the information processing apparatus and the first user terminal, and in the information processing apparatus, the at least one processor configured to execute the instructions to acquire the photographed image from the first user terminal through the second user terminal, and the at least one processor configured to execute the instructions to make, through the second user terminal, a display unit of the first user terminal display the superimposition information.

13. An information processing method comprising:

acquiring a photographed image generated by photographing a user's view by a user terminal;

detecting an exteriorly-installed facility object related to a facility from the photographed image and specifying a facility of interest based on the detected exteriorly-installed facility object;

generating superimposition information based on facility-related information related to the facility of interest, among a plurality of pieces of facility-related information; and controlling the user terminal to display the superimposition information in such a manner that the superimposition information overlaps a view area indicating the user's view, wherein the method further comprises:

acquiring personal information of the user, personal information of a companion of the user, and a degree of importance of the personal information of the companion relative to that of the personal information of the user, and setting a priority to each of the plurality of pieces of facility-related information based on the personal information of the user, the personal information of the companion, and the degree of importance.

* * * * *